United States Patent
Iochi et al.

(10) Patent No.: US 8,068,475 B2
(45) Date of Patent: Nov. 29, 2011

(54) RADIO BASE STATION APPARATUS AND TRANSMISSION RATE NOTIFYING METHOD

(75) Inventors: Hitoshi Iochi, Kanagawa (JP); Hidetoshi Suzuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 673 days.

(21) Appl. No.: 11/579,373

(22) PCT Filed: Apr. 22, 2005

(86) PCT No.: PCT/JP2005/007713
§ 371 (c)(1),
(2), (4) Date: Nov. 2, 2006

(87) PCT Pub. No.: WO2005/109945
PCT Pub. Date: Nov. 17, 2005

(65) Prior Publication Data
US 2008/0310385 A1 Dec. 18, 2008

(30) Foreign Application Priority Data

| | | |
|---|---|---|
| May 6, 2004 | (JP) | 2004-137265 |
| Oct. 22, 2004 | (JP) | 2004-308456 |

(51) Int. Cl.
*H04J 1/00* (2006.01)
(52) U.S. Cl. ......... 370/343; 370/332; 370/345; 455/436
(58) Field of Classification Search .................. None
See application file for complete search history.

(56) References Cited

U.S. PATENT DOCUMENTS

| | | | | |
|---|---|---|---|---|
| 2003/0193913 A1* | 10/2003 | Murata et al. | ................ | 370/332 |
| 2004/0192308 A1* | 9/2004 | Lee et al. | ................ | 455/436 |
| 2005/0226268 A1* | 10/2005 | Wang et al. | ................ | 370/465 |
| 2008/0310385 A1 | 12/2008 | Iochi | | |

FOREIGN PATENT DOCUMENTS

| | | |
|---|---|---|
| JP | 2009-278687 | 11/2009 |
| JP | 2009-278688 | 11/2009 |

OTHER PUBLICATIONS

3GPP, Tdoc R1-030667, "HARQ Efficiency in E-DPDCH", Aug. 25-29, 2003, Table 1 and Table 2.*
PCT International Search Report dated Aug. 2, 2005.
"Node B Controlled Time and Rate Scheduling," (Motorola, Lucent) 3GPP TSG-RAN WG1 #32 meeting, Tdoc R1-030592, May 19-23, 2003.
"System performance of EDCH with rate scheduling (Full buffer, AWGN, 2ms TTI)," (Panasonic) 3GPP TSG-RAN WG1 #35 meeting, Tdoc R1-031320, Nov. 17-21, 2003.
"Text Proposal on DL Signalling Overhead," (Qualcomm), 3GPP TSG-RAN WG1 #35, meeting Tdoc R1-031232, Nov. 17-21, 2003.
"HARQ Efficiency in E-DPDCH," (Qualcomm) 3GPP TSG-RAN WG1 #33 meeting, Tdoc R1-03-0667, Aug. 25-29, 2003, 5 pages total.
Japanese Office Action dated Dec. 8, 2009.

* cited by examiner

*Primary Examiner* — Rafael Pérez-Gutiérrez
*Assistant Examiner* — Daniel Nobile
(74) *Attorney, Agent, or Firm* — Dickinson Wright PLLC

(57) ABSTRACT

A radio base station apparatus wherein the consumption of transmission power resources in a high-rate packet transmission can be suppressed. In the apparatus, a scheduling part (31) limits the candidates of an upstream line packet transmission rate to part of a plurality of transmission rates indicated by transmission rate combination information, selects an upstream line packet transmission rate from among the limited transmission rate candidates, and creates scheduling result information including transmission rate information indicative of the selected transmission rate. The scheduling result information is wireless transmitted from an antenna (108) to a communication terminal that is permitted to transmit upstream line packets.

20 Claims, 26 Drawing Sheets

| | WITHOUT LIMITATION | | WITH LIMITATION: UP TO 32N | | WITH LIMITATION: UP TO 16N | |
|---|---|---|---|---|---|---|
| DATA LENGTH [bits] | SELECTION CANDIDATE | MAPPING | SELECTION CANDIDATE | MAPPING | SELECTION CANDIDATE | MAPPING |
| 128N | YES | 111 | NO | – | NO | – |
| 64N | NO | – | NO | – | NO | – |
| 32N | YES | 110 | YES | 110 | NO | – |
| 24N | NO | – | NO | – | NO | – |
| 16N | YES | 101 | YES | 101 | YES | 101 |
| 12N | NO | – | NO | – | NO | – |
| 8N | YES | 100 | YES | 100 | YES | 100 |
| 6N | NO | – | NO | – | NO | – |
| 4N | YES | 011 | YES | 011 | YES | 011 |
| 3N | YES | 010 | YES | 010 | YES | 010 |
| 2N | YES | 001 | YES | 001 | YES | 001 |
| N | YES | 000 | YES | 000 | YES | 000 |

| TRANSMISSION RATE | SELECTION CANDIDATE | MAPPING |
|---|---|---|
| 4Mbps | YES | 000 |
| 2Mbps | YES | 001 |
| 1Mbps | YES | 010 |
| 512kbps | YES | 011 |
| 256kbps | YES | 100 |
| 128kbps | YES | 101 |
| 64kbps | YES | 110 |
| 32kbps | YES | 111 |

FIG.4

| TRANSMISSION RATE | SELECTION CANDIDATE | MAPPING |
|---|---|---|
| 4Mbps | YES | 00 |
| 2Mbps | YES | 01 |
| 1Mbps | YES | 10 |
| 512kbps | YES | 11 |
| 256kbps | NO | — |
| 128kbps | NO | — |
| 64kbps | NO | — |
| 32kbps | NO | — |

FIG.5

| TRANSMISSION RATE | SELECTION CANDIDATE | MAPPING |
|---|---|---|
| 4Mbps | YES | 00 |
| 2Mbps | NO | — |
| 1Mbps | YES | 01 |
| 512kbps | NO | — |
| 256kbps | YES | 10 |
| 128kbps | NO | — |
| 64kbps | YES | 11 |
| 32kbps | NO | — |

FIG.6

| TRANSMISSION RATE | SELECTION CANDIDATE | MAPPING |
|---|---|---|
| 4Mbps | NO | — |
| 2Mbps | NO | — |
| 1Mbps | NO | — |
| 512kbps | NO | — |
| 256kbps | YES | 00 |
| 128kbps | YES | 01 |
| 64kbps | YES | 10 |
| 32kbps | YES | 11 |

FIG.8

|  | 4 Mbps TERMINAL | | 1 Mbps TERMINAL | |
|---|---|---|---|---|
| TRANSMISSION RATE | SELECTION CANDIDATE | MAPPING | SELECTION CANDIDATE | MAPPING |
| 4Mbps | YES | 00 | NO | — |
| 2Mbps | YES | 01 | NO | — |
| 1Mbps | YES | 10 | YES | 00 |
| 512kbps | YES | 11 | YES | 01 |
| 256kbps | NO | — | YES | 10 |
| 128kbps | NO | — | YES | 11 |
| 64kbps | NO | — | NO | — |
| 32kbps | NO | — | NO | — |

FIG.10

|  | 4 Mbps TERMINAL | | 1 Mbps TERMINAL | |
|---|---|---|---|---|
| TRANSMISSION RATE | SELECTION CANDIDATE | MAPPING | SELECTION CANDIDATE | MAPPING |
| 4Mbps | YES | 00 | NO | — |
| 2Mbps | YES | 01 | NO | — |
| 1Mbps | YES | 10 | YES | 0 |
| 512kbps | YES | 11 | YES | 1 |
| 256kbps | NO | — | NO | — |
| 128kbps | NO | — | NO | — |
| 64kbps | NO | — | NO | — |
| 32kbps | NO | — | NO | — |

FIG.11

| TRANSMISSION RATE | (a) | | (b) | | (c) | |
|---|---|---|---|---|---|---|
| | SELECTION CANDIDATE | MAPPING | SELECTION CANDIDATE | MAPPING | SELECTION CANDIDATE | MAPPING |
| 4Mbps | NO | — | NO | — | NO | — |
| 2Mbps | YES | 00 | NO | — | NO | — |
| 1Mbps | YES | 01 | YES | 00 | YES | 01 |
| 512kbps | YES | 10 | YES | 01 | YES | 10 |
| 256kbps | YES | 11 | YES | 10 | YES | 11 |
| 128kbps | NO | — | YES | 11 | NO | — |
| 64kbps | NO | — | NO | — | NO | — |
| 32kbps | NO | — | NO | — | NO | — |

FIG.13

| TRANSMISSION POWER OFFSET [dB] | WITHOUT LIMITATION | | WITH LIMITATION: UP TO 25 dB | | WITH LIMITATION: UP TO 20 dB | |
|---|---|---|---|---|---|---|
| | SELECTION CANDIDATE | MAPPING | SELECTION CANDIDATE | MAPPING | SELECTION CANDIDATE | MAPPING |
| 30 | YES | 00 | NO | – | NO | – |
| 25 | YES | 01 | YES | 00 | NO | – |
| 20 | YES | 10 | YES | 01 | YES | 00 |
| 15 | YES | 11 | YES | 10 | YES | 01 |
| 10 | NO | – | YES | 11 | YES | 10 |
| 5 | NO | – | NO | – | YES | 11 |
| 0 | NO | – | NO | – | NO | – |
| -5 | NO | – | NO | – | NO | – |

FIG.16

| MAPPING | WITHOUT LIMITATION | WITH LIMITATION: UP TO 25 dB | WITH LIMITATION: UP TO 20 dB |
|---|---|---|---|
| | TRANSMISSION POWER OFFSET [dB] | TRANSMISSION POWER OFFSET [dB] | TRANSMISSION POWER OFFSET [dB] |
| 00 | 30 | 25 | 20 |
| 01 | 25 | 20 | 15 |
| 10 | 20 | 15 | 10 |
| 11 | 15 | 10 | 5 |

FIG.17

| DATA LENGTH [bits] | SELECTION CANDIDATE | MAPPING |
|---|---|---|
| 128N | YES | 1011 |
| 64N | YES | 1010 |
| 32N | YES | 1001 |
| 24N | YES | 1000 |
| 16N | YES | 0111 |
| 12N | YES | 0110 |
| 8N | YES | 0101 |
| 6N | YES | 0100 |
| 4N | YES | 0011 |
| 3N | YES | 0010 |
| 2N | YES | 0001 |
| N | YES | 0000 |

| DATA LENGTH [bits] | HIGH CAPABILITY TERMINAL | | LOW CAPABILITY TERMINAL | |
|---|---|---|---|---|
| | SELECTION CANDIDATE | MAPPING | SELECTION CANDIDATE | MAPPING |
| 128N | YES | 111 | NO | - |
| 64N | YES | 110 | NO | - |
| 32N | YES | 101 | YES | 111 |
| 24N | YES | 100 | YES | 110 |
| 16N | YES | 011 | YES | 101 |
| 12N | YES | 010 | YES | 100 |
| 8N | YES | 001 | YES | 011 |
| 6N | YES | 000 | YES | 010 |
| 4N | NO | - | YES | 001 |
| 3N | NO | - | YES | 000 |
| 2N | NO | - | NO | - |
| N | NO | - | NO | - |

FIG.21

| DATA LENGTH [bits] | HIGH CAPABILITY TERMINAL | | LOW CAPABILITY TERMINAL | |
|---|---|---|---|---|
| | SELECTION CANDIDATE | MAPPING | SELECTION CANDIDATE | MAPPING |
| 128N | YES | 111 | NO | - |
| 64N | NO | - | NO | - |
| 32N | YES | 110 | YES | 111 |
| 24N | NO | - | NO | - |
| 16N | YES | 101 | YES | 110 |
| 12N | NO | - | NO | - |
| 8N | YES | 100 | YES | 101 |
| 6N | NO | - | YES | 100 |
| 4N | YES | 011 | YES | 011 |
| 3N | YES | 010 | YES | 010 |
| 2N | YES | 001 | YES | 001 |
| N | YES | 000 | YES | 000 |

FIG.22

| DATA LENGTH [bits] | LONG TTI SELECTION CANDIDATE | MAPPING | SHORT TTI SELECTION CANDIDATE | MAPPING |
|---|---|---|---|---|
| 128N | YES | 111 | NO | - |
| 64N | YES | 110 | NO | - |
| 32N | YES | 101 | NO | - |
| 24N | YES | 100 | YES | 111 |
| 16N | YES | 011 | YES | 110 |
| 12N | YES | 010 | YES | 101 |
| 8N | YES | 001 | YES | 100 |
| 6N | YES | 000 | YES | 011 |
| 4N | NO | - | YES | 010 |
| 3N | NO | - | YES | 001 |
| 2N | NO | - | YES | 000 |
| N | NO | - | NO | - |

| DATA LENGTH [bits] | LONG TTI SELECTION CANDIDATE | LONG TTI MAPPING | SHORT TTI SELECTION CANDIDATE | SHORT TTI MAPPING |
|---|---|---|---|---|
| 128N | YES | 111 | NO | - |
| 64N | NO | - | NO | - |
| 32N | YES | 110 | NO | - |
| 24N | NO | - | YES | 111 |
| 16N | YES | 101 | NO | - |
| 12N | NO | - | YES | 110 |
| 8N | YES | 100 | YES | 101 |
| 6N | NO | - | YES | 100 |
| 4N | YES | 011 | YES | 011 |
| 3N | YES | 010 | YES | 010 |
| 2N | YES | 001 | YES | 001 |
| N | YES | 000 | YES | 000 |

FIG.25

| DATA LENGTH [bits] | WITHOUT LIMITATION | | WITH LIMITATION: UP TO 32N | | WITH LIMITATION: UP TO 16N | |
|---|---|---|---|---|---|---|
| | SELECTION CANDIDATE | MAPPING | SELECTION CANDIDATE | MAPPING | SELECTION CANDIDATE | MAPPING |
| 128N | YES | 111 | NO | - | NO | - |
| 64N | NO | - | NO | - | NO | - |
| 32N | YES | 110 | YES | 110 | NO | - |
| 24N | NO | - | NO | - | NO | - |
| 16N | YES | 101 | YES | 101 | YES | 101 |
| 12N | NO | - | NO | - | NO | - |
| 8N | YES | 100 | YES | 100 | YES | 100 |
| 6N | NO | - | NO | - | NO | - |
| 4N | YES | 011 | YES | 011 | YES | 011 |
| 3N | YES | 010 | YES | 010 | YES | 010 |
| 2N | YES | 001 | YES | 001 | YES | 001 |
| N | YES | 000 | YES | 000 | YES | 000 |

| DATA LENGTH [bits] | WITHOUT LIMITATION | | WITH LIMITATION: UP TO 32N | | WITH LIMITATION: UP TO 16N | |
|---|---|---|---|---|---|---|
| | SELECTION CANDIDATE | MAPPING | SELECTION CANDIDATE | MAPPING | SELECTION CANDIDATE | MAPPING |
| 128N | YES | 111 | NO | - | NO | - |
| 64N | NO | - | NO | - | NO | - |
| 32N | YES | 110 | YES | 111 | NO | - |
| 24N | NO | - | NO | - | NO | - |
| 16N | YES | 101 | YES | 110 | YES | 111 |
| 12N | NO | - | NO | - | YES | 110 |
| 8N | YES | 100 | YES | 101 | YES | 101 |
| 6N | NO | - | YES | 100 | YES | 100 |
| 4N | YES | 011 | YES | 011 | YES | 011 |
| 3N | YES | 010 | YES | 010 | YES | 010 |
| 2N | YES | 001 | YES | 001 | YES | 001 |
| N | YES | 000 | YES | 000 | YES | 000 |

FIG.28

| MAPPING | WITHOUT LIMITATION DATA LENGTH [bits] | WITH LIMITATION: UP TO 32N DATA LENGTH [bits] | WITH LIMITATION: UP TO 16N DATA LENGTH [bits] |
|---|---|---|---|
| 111 | 128N | UNUSED | UNUSED |
| 110 | 32N | 32N | UNUSED |
| 101 | 16N | 16N | 16N |
| 100 | 8N | 8N | 8N |
| 011 | 4N | 4N | 4N |
| 010 | 3N | 3N | 3N |
| 001 | 2N | 2N | 2N |
| 000 | N | N | N |

FIG.29

| MAPPING | WITHOUT LIMITATION DATA LENGTH [bits] | WITH LIMITATION: UP TO 32N DATA LENGTH [bits] | WITH LIMITATION: UP TO 16N DATA LENGTH [bits] |
|---|---|---|---|
| 111 | 128N | 32N | 16N |
| 110 | 32N | 16N | 12N |
| 101 | 16N | 8N | 8N |
| 100 | 8N | 6N | 6N |
| 011 | 4N | 4N | 4N |
| 010 | 3N | 3N | 3N |
| 001 | 2N | 2N | 2N |
| 000 | N | N | N |

FIG.30

| MAPPING | SF4 x 6codes DATA LENGTH [bits] | SF4 x 2codes DATA LENGTH [bits] | SF4 x 1code DATA LENGTH [bits] |
|---|---|---|---|
| 111 | 128N | 32N | 16N |
| 110 | 32N | 16N | 12N |
| 101 | 16N | 8N | 8N |
| 100 | 8N | 6N | 6N |
| 011 | 4N | 4N | 4N |
| 010 | 3N | 3N | 3N |
| 001 | 2N | 2N | 2N |
| 000 | N | N | N |

FIG.31

RADIO BASE STATION APPARATUS AND
TRANSMISSION RATE NOTIFYING
METHOD

TECHNICAL FIELD

The present invention relates to a wireless base station apparatus and a method for reporting a transmission rate.

BACKGROUND ART

Conventionally, various patterns of improvements have been made regarding a scheme, e.g., HSDPA (High Speed Downlink Packet Access), which allows high speed packet transmission on the downlink from a wireless base station to a communication terminal. This is associated with a need for an expansion which allows data transmission of a large capacity or low latency also on the uplink from a wireless base station to a communication terminal, and the standardization of high speed packet transmission is currently considered by 3GPP.

Also in the high speed packet transmission on the uplink, like on the downlink, a study for introduction of a scheduling technique is ongoing. Uplink packet scheduling is carried out in a base station and the base station transmits the prepared scheduling information to each communication terminal. Each communication terminal transmits an uplink packet to the base station based on the scheduling information received from the base station. Moreover, in scheduling in the base station, a communication terminal which is allowed to transmit an uplink packet is selected, and, to this selected communication terminal, communication parameters such as allowed transmission rate and transmission power are transmitted on a downlink control signal.

One of the scheduling methods in high speed packet transmission on the uplink is a method called "Time and rate scheduling" (see non-patent document 1). This "time and rate scheduling" includes the following three steps. That is, in the first step, a communication terminal reports a transmission rate request, data amount, transmission power margin and so on to a base station. Next, in the second step, the base station carries out scheduling based on the reported transmission rate request, data amount, transmission power margin and so on, and selects a communication terminal which is allowed to transmit an uplink packet, and, to this selected communication terminal, communication parameters such as allowed transmission rate and transmission power, are indicated on a downlink control signal. Then, in the third step, the communication terminal, which received a control signal addressed to the communication terminal, transmits an uplink packet at a transmission rate lower than the transmission rate indicated by the base station or with a transmission power lower than the transmission power indicated by the base station.

Here, as the transmission rate which is available for high speed packet transmission on the uplink, 32 patterns of MCS's (Modulation and Coding Scheme) are proposed in "3GPP, R1-030667, HARQ Efficiency in E-DPDCH" (non-patent document 2). Moreover, with regard to the transmission of a control signal on the downlink when using these MCS's in time and rate scheduling, a proposal is made in "3GPP, R1-031232, Text Proposal on DL Signaling Overhead" (non-patent document 3). In non-patent document 3, "5-bit reconfiguration pointer" is proposed as "E-DCH TFCS reconfiguration" (i.e., scheduling Grant for Time-and-Rate scheduling). Because 32 patterns can be represented with five bits, non-patent document 3 proposes that 32 patterns of control signals capable of indicating all the 32 patterns of MCS's to a communication terminal are prepared in advance.

Non-Patent Document 1: 3 GPP, R1-030592, Node B Controlled Time and Rate Scheduling
Non-Patent Document 2: 3 GPP, R1-030667, HARQ Efficiency in E-DPDCH
Non-Patent Document 3: 3 GPP, R1-031232, Text Proposal on DL Signaling Overhead

DISCLOSURE OF INVENTION

Problems to be Solved by the Invention

However, as described above, if control signals are provided to express all the transmission rates available for high speed packet transmission on the uplink are prepared, the number of bits of control signals will increase. For example, as described above, if 32 patterns of control signals capable of indicating all the 32 patterns of MCS's to the communication terminal are prepared, the required number of bits for control signals is five bits. Then, if the number of bits for control signals increases, as shown in FIG. 32, the transmission power for the control signals needs to be increased in order to fulfill required received quality (error rate) in the communication terminal for the control signals.

For example, in a wireless communication system which carries out high speed packet transmission on the uplink and high speed packet transmission on the downlink simultaneously, the number of bits of control signals transmitted on the downlink will affect transmission power of the downlink packet. That is, because transmission power resources for the downlink has an upper limit as shown in FIG. 33, if the number of bits of downlink control signals increases from N bits to M bits (N<M) the transmission power of downlink control signals increases correspondingly, and on the other hand transmission power resources available for the downlink packet will decrease correspondingly. As a result, sufficient transmission power resources cannot be assigned to the downlink packet, which presents a problem of quality degradation of the downlink packet and a decrease in the transmission rate.

Moreover, as shown in FIG. 34, even in the case where there is some room in transmission power resources for the downlink, and a sufficient transmission power resource can be assigned to the downlink packet even if the number of bits of downlink control signals increases from N bits to M bits, the total transmission power in the base station increases due to an increase in the transmission power due to an increase in the number of bits of downlink control signals, and therefore there is a problem that interference against other cells will increase.

Note that such problems are the problems occurring similarly not only in transmitting the control signals on the downlink, but in transmitting the control signals on the uplink.

In reporting communication parameters, such as the data length for a packet transmitted on the uplink, to a base station from a communication terminal, if, for example, 32 patterns of control signals capable of reporting the base station of all 32 patterns of data lengths are prepared, the required number of bits of control signals transmitted on the uplink is five bits. Then, if the number of bits of control signals increases, the transmission power of the control signals needs to be increased in order to fulfill the required received quality (error rate) in the base station for the control signal, as described above. Accordingly, as described above, also on the uplink, problems such as a decrease in the packet quality, a decrease in the transmission rate, and an increase in interference against other cells will occur.

In this way, an increase in the number of bits of control signals for reporting communication parameters will cause problems both on the downlink and on the uplink.

It is therefore an object of the present invention to provide a wireless base station apparatus and a transmission rate reporting method capable of suppressing the consumption of transmission power resources.

Means for Solving the Problem

The wireless base station apparatus of the present invention selects one transmission rate from a plurality of transmission rates and reports the selected transmission rate to a communication terminal apparatus that is allowed to transmit an uplink packet, and this wireless base station apparatus employs a configuration having: a limiter that limits selectable candidates of transmission rates to part of the plurality of transmission rates; a selector that selects a transmission rate for the uplink packet from the limited candidates of transmission rates; and a transmitter that wirelessly transmits transmission rate information indicating the selected transmission rate to the communication terminal apparatus.

Advantageous Effect of the Invention

According to the present invention, the consumption of transmission power resources due to an increase in the transmission power for control signals can be suppressed.

BRIEF DESCRIPTION OF DRAWINGS

FIG. 4 is transmission rate combination information according to Embodiment 1 of the present invention;

FIG. 5 is a view for explaining the scheduling section according to Embodiment 1 of the present invention;

FIG. 6 is a view for explaining a scheduling section according to Embodiment 2 of the present invention;

FIG. 8 is a view for explaining the scheduling method according to Embodiment 3 of the present invention;

FIG. 10 is a view for explaining the scheduling section according to Embodiment 4 of the present invention;

FIG. 11 is a view for explaining the scheduling section according to Embodiment 4 of the present invention;

FIG. 13 is a view for explaining the scheduling section according to Embodiment 5 of the present invention;

FIG. 16 is a view for explaining the scheduling section according to Embodiment 6 of the present invention;

FIG. 17 is a view for explaining the scheduling section according to Embodiment 6 of the present invention;

FIG. 21 is a view for explaining the transmission rate selection section according to Embodiment 7 of the present invention;

FIG. 22 is a view for explaining the transmission rate selection section according to Embodiment 7 of the present invention;

FIG. 25 is a view for explaining the transmission rate selection section according to Embodiment 8 of the present invention;

FIG. 28 is a view for explaining the transmission rate selection section according to Embodiment 9 of the present invention;

FIG. 29 is a view for explaining the transmission rate selection section according to Embodiment 9 of the present invention;

FIG. 30 is a view for explaining the transmission rate selection section according to Embodiment 9 of the present invention;

FIG. 31 is a view for explaining the transmission rate selection section according to Embodiment 9 of the present invention;

BEST MODE FOR CARRYING OUT THE INVENTION

Embodiments of the present invention will be described below in detail with reference to the accompanying drawings.

Embodiment 1

Figure 1:
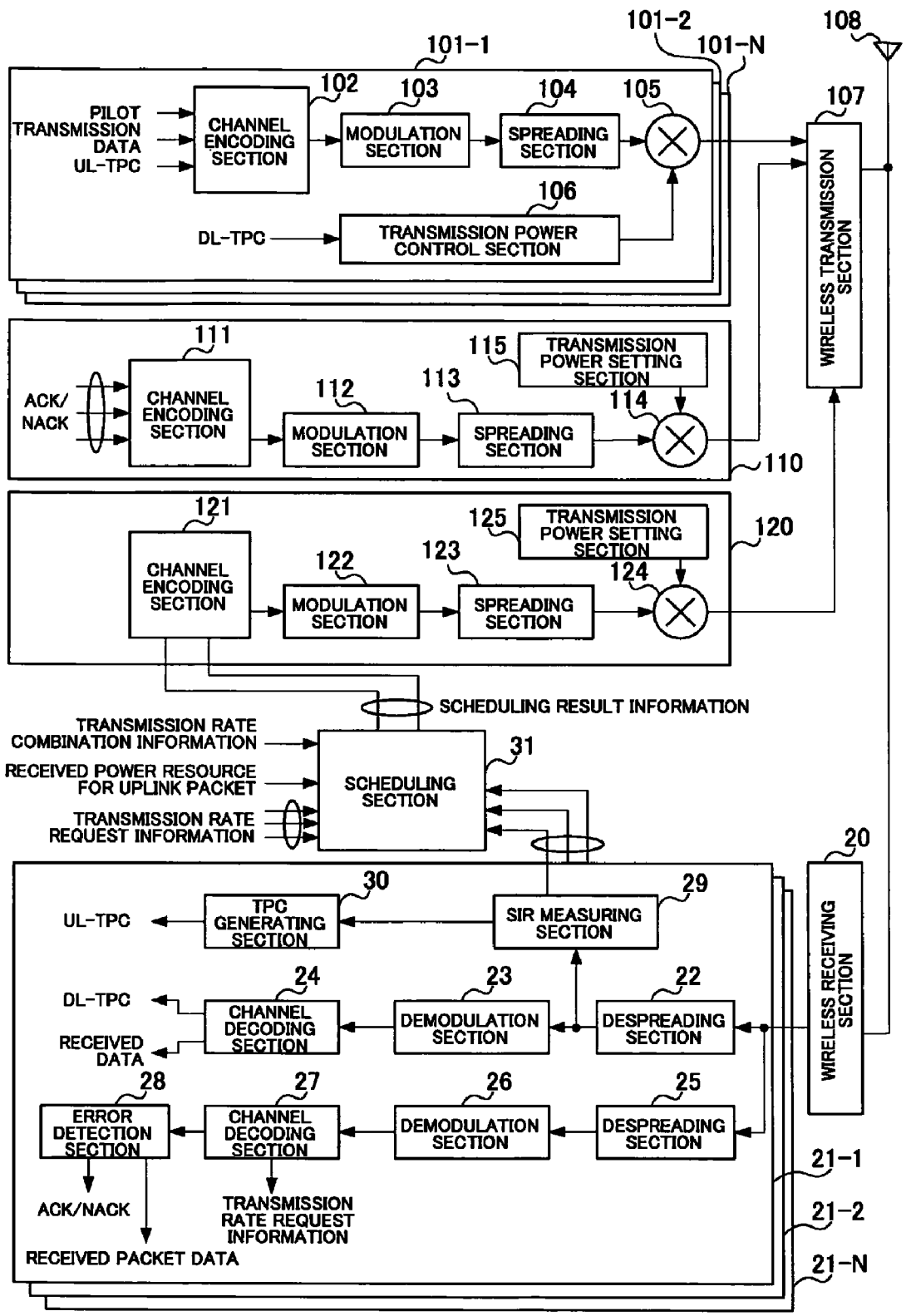
FIG. 1 is a block diagram showing a configuration of a wireless base station apparatus according to Embodiment 1 of the present invention.

FIG. 1 is a block diagram showing a configuration of a wireless base station apparatus according to Embodiment 1 of the present invention.

The wireless base station apparatus shown in FIG. 1 includes dedicated channel signal forming units 101-1 to 101-N of the number of communication terminals carrying out communication, and includes control signal forming units 110 and 120.

The dedicated channel signal forming units 101-1 to 101-N form a dedicated channel signal addressed to each communication terminal by spreading transmission data addressed to each communication terminal using a spreading code assigned to each communication terminal, respectively.

On the other hand, the control signal forming units 110 and 120 form a control signal by spreading control information addressed to each communication terminal, the control information of when each communication terminal transmits an uplink packet, using a spreading code common for the communication terminals within a cell.

Because the processings of the dedicated channel signal forming units 101-1 to 101-N each are the same, the configuration of only one dedicated channel signal forming unit 101-1 will be described. The dedicated channel signal forming unit 101-1 multiplexes a pilot signal (PILOT), transmission data, and an uplink transmission power control command (UL-TPC) by a channel encoding section 102. In addition, with respect to the transmission data, an error correction encoding process is carried out before multiplexing. The signal after multiplexing is modulated by a modulation section 103 and is then transmitted to a spreading section 104.

The spreading section 104 spreads the modulation signal using a spreading code dedicated to a communication terminal. That is, in the dedicated channel signal forming units 101-1 to 101-N each, a spreading process is carried out using a different spreading code, respectively. The signal after the spreading process is transmitted to an amplifying section 105. The amplifying section 105 amplifies the power of the spread signal in accordance with a transmission power control signal from a transmission power control section 106, and transmits the amplified signal to a wireless transmission section 107.

Thereby, a dedicated channel signal dedicated for each communication terminal, the dedicated channel signal being formed using a different spreading code, respectively, is outputted from the dedicated channel signal forming units 101-1 to 101-N each. The dedicated channel signal is transmitted via an antenna 108 after undergoing predetermined wireless processings such as an analog-to-digital conversion and an up-conversion, by the wireless transmission section 107.

On the other hand, the control signal forming unit 110 inputs to a channel encoding section 111 an ACK/NACK addressed to each communication terminal, the ACK/NACK being obtained by an error detection section 28. The channel encoding section 111 time-division multiplexes the ACK/NACK to a position determined in advance with each communication terminal, the ACK/NACK being addressed to each communication terminal. The output from the channel encoding section 111 is transmitted to a spreading section 113 after undergoing a modulation processing by a modulation section 112.

The spreading section 113 spreads the modulation signal using a spreading code common to all the communication terminals currently communicating. The signal after the spreading process is transmitted to an amplifying section 114. The amplifying section 114 amplifies the power of the spread signal in accordance with a transmission power control signal from a transmission power setting section 115, and transmits the amplified signal to the wireless transmission section 107.

Moreover, the control signal forming unit 120 inputs to an channel encoding section 121 scheduling result information addressed to each communication terminal obtained by a scheduling section 31. The channel encoding section 121 time-division multiplexes the scheduling result information addressed to each communication terminal to the position determined with each communication terminal in advance. The output from the channel encoding section 121 is transmitted to a spreading section 123 after undergoing a modulation processing by a modulation section 122.

The spreading section 123 spreads the modulation signal using a spreading code common to all the communication terminals currently communicating. The signal after the spreading process is transmitted to an amplifying section 124. The amplifying section 124 amplifies the power of the spread signal in accordance with a transmission power control signal from a transmission power setting section 125, and transmits the amplified signal to the wireless transmission section 107.

Accordingly, from the control signal forming units 110 and 120, a control signal (ACK/NACK and scheduling result information in this embodiment) of when each communication terminal transmits an uplink packet using a dedicated channel is outputted, which control signal is time-division multiplexed at a timing determined with the communication terminal and is spread using a spreading code common at each communication terminal. This control signal is transmitted via the antenna 108 after undergoing predetermined wireless processings such as an analog-to-digital conversion and an up-conversion, by the wireless transmission section 107. In addition, although here an example, in which control information of when transmitting an uplink packet (ACK/NACK and scheduling result information in this embodiment) is time-division multiplexed at a timing determined between the communication terminal, has been described, the code multiplexing may be carried out by further assigning an orthogonal signature on one spreading code, and so on. Moreover, although here an example in which one spreading code is shared between a plurality of communication terminals has been described, a plurality of spreading codes may be used at a plurality of communication terminals.

Moreover, in the wireless base station apparatus shown in FIG. 1, a signal received by the antenna 108 is inputted to a wireless receiving section 20. The wireless receiving section 20 obtains a received baseband signal by carrying out predetermined wireless processings, such as a down-conversion and an analog-to-digital conversion, to the received signal, and transmits this to receiving processing units 21-1 to 21-N which are prepared in the number N of the communication terminals. Because the processing of the receiving processing units 21-1 to 21-N each are the same, the configuration of only one receiving processing unit 21-1 will be described here.

By carrying out to a received baseband signal a despreading process using a spreading code corresponding to the communication terminal, a despreading section 22 extracts a dedicated channel signal transmitted from the communication terminal and outputs the result to a demodulation section 23. Moreover, the despreading section 22 despreads the pilot symbol and transmits the result to an SIR measuring section 29.

The demodulation section 23 carries out a demodulation processing to the output signal of the despreading section 22 and transmits the demodulation signal to a channel decoding section 24. The channel decoding section 24 carries out a decoding process such as an error correction decoding and so on to the output signal of the demodulation section 23 and extracts received data, a transmission power control command for the downlink (DL-TPC) and so on. Incidentally, the received data is transmitted to a higher control station of the base station, and the DL-TPC is transmitted to the transmission power control section 106.

The SIR measuring section 29 calculates an interference wave power from a variance of the pilot symbol after despreading, calculates the ratio of the desired wave power and the interference wave power (SIR), and transmits information indicating the SIR to a TPC generating section 30 and scheduling section 31. The TPC generating section 30 generates a transmission power control command (UL-TPC) for the uplink, the transmission power control command (UL-TPC) indicating an increase and a decrease on uplink transmission power, based on a magnitude relationship between the received SIR of the uplink and a target SIR, and transmits this UL-TPC to the channel encoding section 102.

The scheduling section 31 determines a communication terminal which is allowed to transmit an uplink packet, based on transmission rate request information, SIR, transmission rate combination information, and received power resources for the uplink packet from each communication terminal, and carries out scheduling which determines MCS (i.e., transmission rate) of when transmitting this uplink packet. Then, the scheduling section 31 transmits to the channel encoding section 121 scheduling result information formed with information indicating the determined transmission rate (transmission rate information) and information indicating the determined communication terminal (terminal information). In addition, in this embodiment, the scheduling section 31 carries out time and rate scheduling.

A despreading section 25 carries out a despreading process of the received baseband signal with the same spreading factor as that of when the communication terminal spread the uplink packet. In addition, information, such as a spreading factor and M-ary number of this uplink packet, and an encoding rate, is embedded into a signal and is transmitted by the communication terminal, and the wireless base station apparatus shown in FIG. 1 extracts these information embedded in the received data, for example, and reports them to the despreading section 25, a demodulation section 26, and a channel decoding section 27. That is, the despreading section 25, the demodulation section 26, and the channel decoding section 27 are configured as to be able to change the spreading factor, the M-ary number, and the encoding rate corresponding to the transmission parameter information from the communication terminal.

The demodulation section 26 carries out a demodulation processing to the uplink packet outputted from the despreading section 25 and transmits the demodulation signal to the channel decoding section 27. The channel decoding section 27 carries out a decoding process such as error correction decoding and so on to the demodulation signal, extracts a received packet, and outputs the received packet to the error detection section 28. Moreover, the channel decoding section 27 extracts the transmission rate request information and transmits this to the scheduling section 31.

The error detection section 28 carries out an error detection to the received packet. Then, if an error has not been detected, the error detection section 28 transmits to the channel encoding section 111 an ACK signal indicating successful demodulation, while it outputs the received packet to a higher control station of the base station. On the other hand, if an error has been detected, the error detection section 28 transmits to the channel encoding section 111 a NACK signal indicating unsuccessful demodulation.

Figure 2:
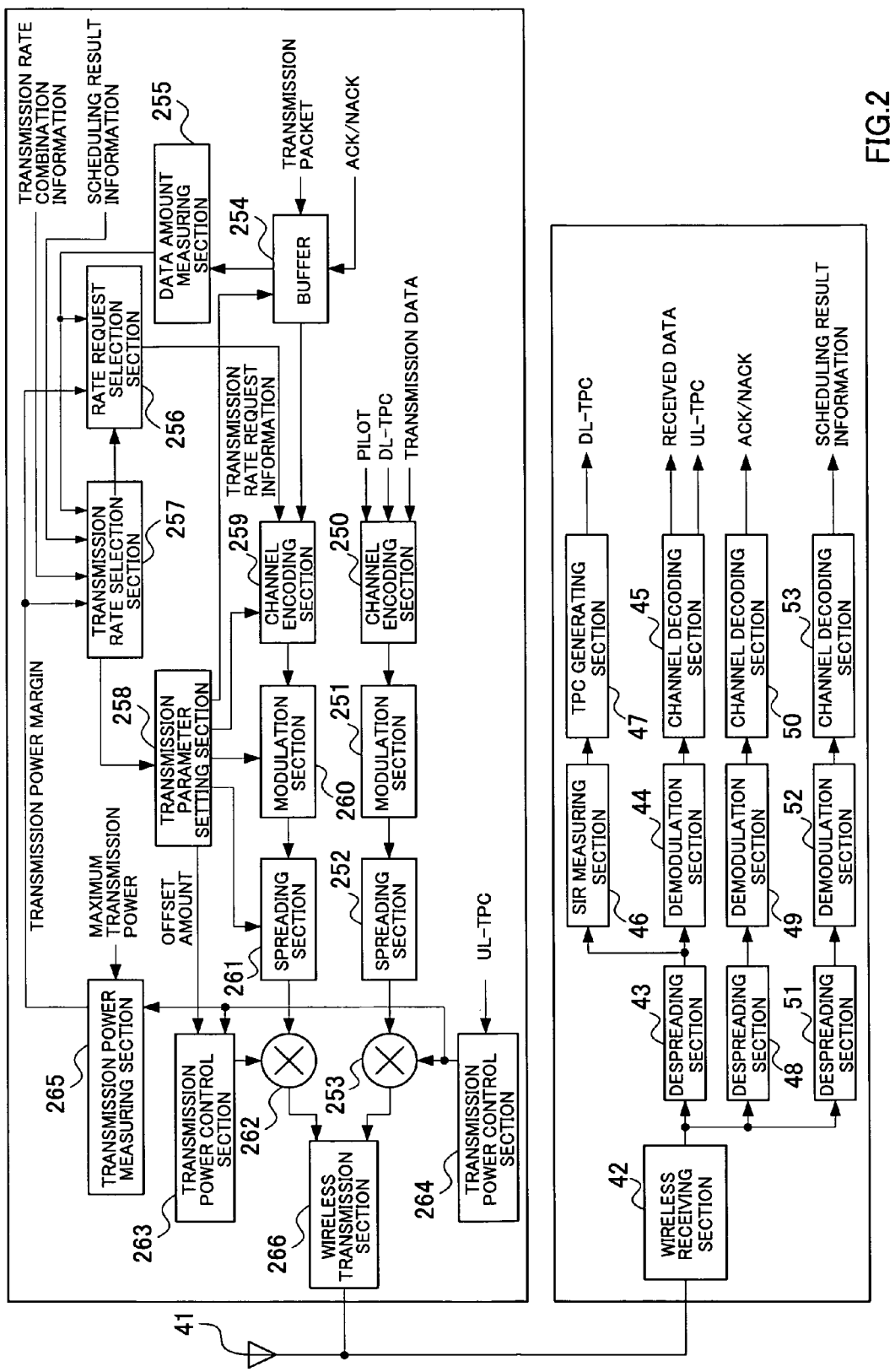
FIG. 2 is a block diagram showing a configuration of a communication terminal according to Embodiment 1 of the present invention.

Next, a communication terminal to communicate with the wireless base station apparatus shown in FIG. 1 will be described. FIG. 2 is a block diagram showing a configuration of a communication terminal according to Embodiment 1 of the present invention.

First, a receiving system will be described. The communication terminal shown in FIG. 2 inputs to a wireless receiving section 42 a signal received via an antenna 41. By carrying out down-conversion and analog-to-digital conversion processings to the received signal, the wireless receiving section 42 obtains a received baseband signal and transmits this to despreading sections 43, 48 and 51.

The despreading section 43 obtains a signal addressed to the communication terminal by carrying out a despreading process using a spreading code dedicated to this communication terminal. The despreading signal undergoes a demodulation processing and a decoding processing sequentially by a demodulation section 44 and a channel decoding section 45, thereby obtaining the received data and the uplink transmission power control command (UL-TPC). Moreover, the despreading signal is sequentially inputted to an SIR measuring section 46 and a TPC generating section 47, thereby obtaining the downlink transmission power control command (DL-TPC) from the TPC generating section 47.

A despreading section 48 extracts a control signal by despreading the received baseband signal outputted from the wireless receiving section 42 using a spreading code common to each communication terminal within the cell. The despreading signal outputted from the despreading section 48 is inputted to a channel decoding section 50 after being demodulated by a demodulation section 49. The channel decoding section 50 extracts an ACK/NACK addressed to the communication terminal among ACK/NACK's which are time-division multiplexed into the control signal, the ACK/NACK's being addressed to communication terminals each. Based on this ACK/NACK, the communication terminal controls the retransmit of an uplink packet.

Moreover, a despreading section 51 extracts a control signal by despreading the received baseband signal outputted from the wireless receiving section 42 using a spreading code common to communication terminals within the cell. The despreading signal outputted from the despreading section 51 is inputted to a channel decoding section 53 after being demodulated by a demodulation section 52. The channel decoding section 53 extracts scheduling result information addressed to the communication terminal among scheduling result information, which are time-division multiplexed into the control signal, the scheduling result information being addressed to the communication terminals each. Based on this scheduling result information, the communication terminal controls the transmission rate of an uplink packet.

Next, a transmitting system will be described. The communication terminal shown in FIG. 2 changes the encoding rate, M-ary number and spreading factor for a transmission packet, while it does not change these parameters for the other data. Specifically, the pilot signal (PILOT), the downlink signal transmission power control command (DL-TPC), and the transmission data are processed sequentially by a channel encoding section 250, a modulation section 251, and a spreading section 252, whose encoding rate, M-ary number, and spreading factor are fixed, respectively, and thereafter a signal after spreading is transmitted to an amplifying section 253.

On the other hand, the transmission packet is stored in a buffer 254 first. Based on the ACK/NACK, the buffer 254 eliminates, in case of ACK, the transmission packet which was previously transmitted, and outputs the first transmission packet to a channel encoding section 259, and in case of NACK, it will output again the transmission packet, which was previously transmitted, to the channel encoding section 259.

Moreover, the data amount of a transmission packet stored in the buffer 254 is measured by a data amount measuring section 255, and the data amount measuring section 255 transmits the measurement result to a transmission rate selection section 257 and a rate request selection section 256.

Based on transmission rate information contained in the scheduling result information, which was transmitted from the wireless base station apparatus shown in FIG. 1 and was extracted by the channel decoding section 53, the data storage amount in the buffer 254, the transmission power margin, and the transmission rate combination information, the transmission rate selection section 257 selects the transmission rate of an uplink packet which is actually to be transmitted, in a range of the transmission rate indicated by the transmission rate information or less, and reports the selected transmission rate to the rate request selection section 256, and reports a transmission parameter setting section 258 of the same. Here, when transmission power resources of the communication terminal are in short, or when the amount of transmission data of the communication terminal is small, and so on, the transmission rate selection section 257 may select a transmission rate lower than the transmission rate indicated by the transmission rate information.

Based on the transmission rate reported from the transmission rate selection section 257, the data storage amount in the buffer 254, and the transmission power margin, the rate request selection section 256 generates transmission rate request information and transmits this to a channel encoding section 259. This transmission rate request information is information indicating the transmission rate of a transmission packet which the communication terminal desires and which is expressed with 1 to n (where n is a natural number of two or more), for example.

Based on the transmission rate reported from the transmission rate selection section 257, the transmission parameter setting section 258 sets the encoding rate in the channel encoding section 259, the M-ary number in the modulation section 260, and the spreading factor in the spreading section 261, and transmits these transmission parameters to the channel encoding section 259, the modulation section 260, and the spreading section 261, respectively, while it controls the read rate of the transmission packet stored in the buffer 254. Moreover, the transmission parameter setting section 258 sets the amount of offset of the transmission power at the time of transmitting a packet, based on the transmission rate, and transmits this to a transmission power control section 263.

Incidentally, the transmission power margin inputted to the transmission rate selection section 257 and rate request selection section 256 is set by the transmission power measuring section 265. Specifically, the transmission power measuring section 265 sets the transmission power margin based on a transmission power controlled by the transmission power control section 264 in accordance with the uplink transmission power control command (UL-TPC), and a maximum transmission power which the communication terminal can transmit. In addition, the transmission power control section 263 for generating a transmission power control signal of a transmission packet is adapted to generate a transmission power control signal made by giving an offset, the offset being set by the transmission parameter setting section 258, to a control signal from the transmission power control section 264 which generates other pilot signals, the downlink transmission power control command (DL-TPC), and a transmission power control signal of transmission data.

After the spread signals each outputted from the spreading section 252 and spreading section 261 are independently amplified by the corresponding amplifying sections 253 and 262, respectively, they undergo predetermined wireless processings such as a digital-to-analog conversion and an up-conversion by a wireless transmission section 266, and thereafter are transmitted via the antenna 41.

Figure 3:
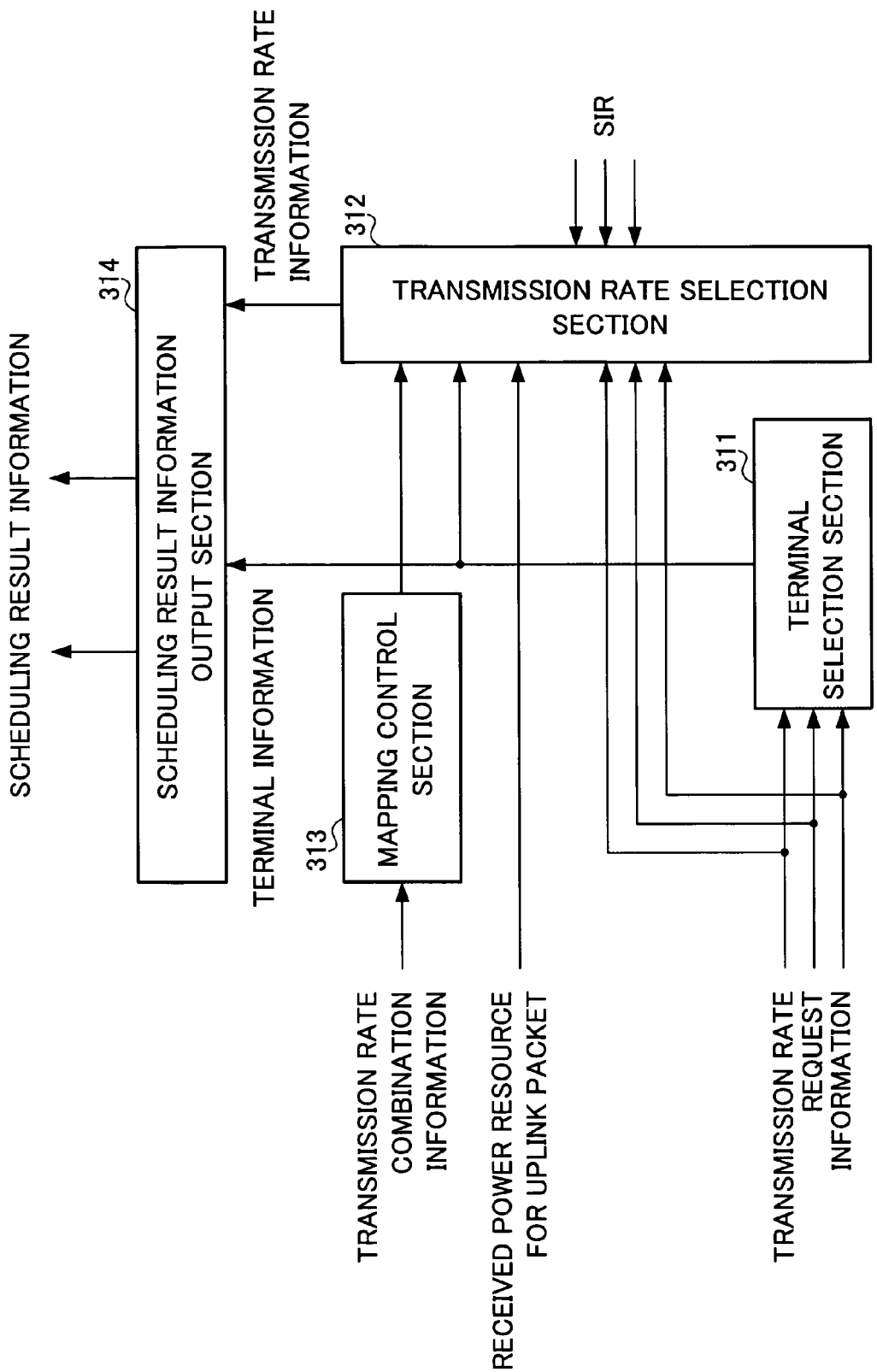
FIG. 3 is a block diagram showing a configuration of a scheduling section according to Embodiment 1 of the present invention.

Next, the scheduling section 31 of the wireless base station apparatus shown in FIG. 1 will be described. FIG. 3 is a block diagram showing a configuration of the scheduling section of the wireless base station apparatus according to Embodiment 1 of the present invention.

In FIG. 3, to a terminal selection section 311, transmission rate request information (a transmission rate to request, or a transmission power margin, a data amount, and so on) transmitted from a communication terminal is inputted. The terminal selection section 311 selects in accordance with a predetermined scheduling algorithm (for example, a round-robin method, a proportional fairness method, and so on) a communication terminal which is allowed to transmit an uplink packet among the terminals which transmitted transmission rate request information. Then, terminal information indicating the selected terminal (for example, the terminal number) is inputted to a transmission rate selection section 312 and a scheduling result information output section 314.

To a mapping control section 313, transmission rate combination information indicating a combination of a plurality of transmission rates which can be taken as the transmission rate of an uplink packet is inputted. In addition, the transmission rate combination information may be specific to the mobile communication system, or may be the one stored somewhere in the base station apparatus, or may be the one reported from a higher control station. Then, the mapping control section 313 limits the candidates of transmission rates, which may be selected in the transmission rate selection section 312, to part of the plurality of transmission rates indicated by the transmission rate combination information. Then, the mapping control section 313 converts the limited candidates of transmission rates into bits, respectively, maps them and inputs the mapped bits to the transmission rate selection section 312. In addition, a more specific operation of the mapping control section 313 will be described later.

To the transmission rate selection section 312, transmission rate request information and received power resources for an uplink packet are inputted. Moreover, to the transmission rate selection section 312, terminal information is inputted from the terminal selection section 311, the mapped bits (i.e., the limited candidates of transmission rates) are inputted from the mapping control section 313, and an SIR is inputted from the SIR measuring section 29. The transmission rate selection section 312 selects, in a range of the received power resource for an uplink packet, one transmission rate out of the transmission rate candidates limited by the mapping control section 313, as a transmission rate allowed for an uplink packet which the communication terminal selected by the terminal selection section 311 (i.e., the communication terminal which is allowed to transmit an uplink packet) transmits. Based on the received powers required for the respective transmission rate candidates (offset information which indicates at how much power to be transmitted from the communication terminal to a dedicated channel) which are limited in the mapping control section 313, and SIR, the transmission rate selection section 312 predicts a received power for each transmission rate and selects a transmission rate which becomes the maximum rate in a range of the received power resources for the uplink packet. Then, the transmission rate selection section 312 inputs to a scheduling result information output section 314 transmission rate information indicating the selected transmission rate.

The scheduling result information output section 314 combines the terminal information inputted from the terminal selection section 311 with the transmission rate information inputted from the transmission rate selection section 312 to thereby prepare scheduling result information, and inputs this scheduling result information to the channel encoding section 121. Then, the scheduling result information is wirelessly transmitted from an antenna 108 as a control signal, with a communication terminal indicated by the terminal information being the destination, and it is reported to the communication terminal.

Next, a more specific operation of the mapping control section 313 will be described.

First, to the mapping control section 313, transmission rate combination information shown in FIG. 4 is inputted. In the transmission rate combination information shown in FIG. 4, for example, eight patterns of transmission rates from 32 kbps to 4 Mbps are shown as a combination of the transmission rates which can be taken as the transmission rate of an uplink packet. That is, in this mobile communication system, eight patterns of transmission rates from 32 kbps to 4 Mbps can be used as the transmission rate of an uplink packet. Accordingly, in the transmission rate combination information, all the eight patterns of transmission rates are defined as the selection candidate (the transmission rate to be a selection candidate is expressed as 'YES'). Moreover, because there are eight patterns of transmission rates indicated by the transmission rate combination information, three bits ($2^3$) are needed in order to express these with a bit sequence, as shown in FIG. 4. Then, the eight patterns of transmission rates from 32 kbps to 4 Mbps are mapped onto three bits of '111' to '000', respectively.

Then, the mapping control section 313 limits the candidates of transmission rates to four patterns of transmission rates from 512 kbps to 4 Mbps among eight patterns of transmission rates from 32 kbps to 4 Mbps indicated by the transmission rate combination information, as shown in FIG. 5 (the transmission rate to be a selection candidate is expressed as 'YES', and the transmission rate not to be a selection candidate is expressed as 'NO'). Because the transmission rate candidates limited by the mapping control section 313 are provided in four patterns in the example of FIG. 5, two bits ($2^2$) are required in order to express with a bit sequence. In this way, the number of bits of the transmission rate candidates to be limited is made to be less than the number of bits of the transmission rates indicated by the transmission rate combination information. Then, the mapping control section 313 maps the four patterns of transmission rates from 512 kbps to 4 Mbps onto two bits of '11' to '00', respectively. Then, the mapped four patterns of transmission rate candidates are inputted to the transmission rate selection section 312.

In the transmission rate selection section 312, the transmission rate of an uplink packet, which the communication terminal selected by the terminal selection section 311 transmits, is selected out of the limited four patterns of candidates of transmission rates, i.e., 512 kbps ('11'), 1 Mbps ('10'), 2 Mbps ('01'), and 4 Mbps ('00').

Here, Time and Rate Scheduling is a scheduling method suitable for causing a small number of communication terminals to transmit an uplink packet at a high transmission rate. For this reason, it is very unlikely that a low transmission rate is selected in the transmission rate selection section 312, and accordingly, even excluding the lower transmission rates out of the selection candidates would have little effect. Then, in this embodiment, as shown in FIG. 5, the mapping control section 313 limits the candidates of transmission rates to four patterns of transmission rates in descending order from the higher one among eight patterns of transmission rates indicated by the transmission rate combination information.

In addition, four patterns of transmission rates excluded from the selection candidates may be reported using the conventional dedicated channel or a scheduling method targeted for other middle to low rates. For example, as described in non-patent document 2, rate scheduling in which an addition or deletion (E-DCH TFCS addition/deletion) of a transmission rate is carried out in an up/down pointer may be used.

In this way, according to this embodiment, because the patterns of transmission rates which can be reported to a communication terminal is reduced from eight patterns to four patterns to thereby reduce the number of bits of the transmission rate information from three bits to two bits, the transmission power of the downlink control signal can be reduced. Accordingly, the consumption of transmission power resources for the downlink can be suppressed. Moreover, the reduction of the number of bits of the transmission rate information will reduce the number of combinations of the transmission rates from eight patterns to four patterns, and thus an inter-symbol distance between transmission rate information each will increase correspondingly. As a result, the accuracy of decision on the transmission rate information in the communication terminal can be improved.

In addition, although in this embodiment an example in which the patterns of transmission rates which can be reported to a communication terminal is limited from eight patterns to four patterns has been described, they may be limited from eight patterns to seven patterns or less, for example. For example, when '000' and '111' are excluded from '000' to '111' and the patterns of transmission rates which can be reported to a communication terminal are limited to six patterns, the number of bits of the transmission rate information remains three bits. However, the number of combination of transmission rates decreases to six patterns from eight patterns, and, correspondingly, the inter-symbol distance between transmission rate information each will increase. That is, when '000' is excluded, it is less likely that the reported '100', '010', and '001' are mistaken for '000' in the communication terminal, thereby reducing the error rate. In the same way, when '111' is excluded, it is less likely that the reported '110', '101', and '011' are mistaken for '111' in the communication terminal, thereby reducing the error rate. In this way, if the number of candidates of selectable transmission rates is limited, the error rate will decrease without reducing the number of bits in transmission rate information after limiting. Accordingly, in attempting to maintain the error rate after limiting at the same level as the error rate before limiting, the transmission power of the downlink control signal for transmitting the transmission rate information can be reduced by the improvement in error rate characteristics.

Embodiment 2

In this embodiment, a case will be described in which the candidates of transmission rates are limited while substantially maintaining the range of selectable transmission rates.

Like in Embodiment 1, to the mapping control section 313 the transmission rate combination information shown in FIG. 4 is inputted. Then, the mapping control section 313 limits the candidates of transmission rates to four patterns of transmission rates of 64 kbps, 256 kbps, 1 Mbps, and 4 Mbps among eight patterns of transmission rates from 32 kbps to 4 Mbps indicated by transmission rate combination information, as shown in FIG. 6. In the transmission rate combination information shown in FIG. 4, the relationship between the adjoining transmission rates among eight patterns of transmission rates from 32 kbps to 4 Mbps is a double relationship. On the other hand, in FIG. 6, the transmission rates to be selection candidates are limited to four patterns of 64 kbps, 256 kbps, 1 Mbps, and 4 Mbps, and the relationship between the adjoining transmission rates among four patterns of transmission rates is a quadruple relationship. That is, in this embodiment, in limiting the candidates of transmission rates, the range of change between the respective limited candidates of transmission rates is made larger than the range of change between the respective plurality of transmission rates indicated by the transmission rate combination information. Moreover, in this embodiment, in limiting the candidates of transmission rates, the maximum transmission rate and the lowest transmission rate are substantially maintained. Specifically, the selectable range is 32 kbps to 4 Mbps in FIG. 4, whereas it is 64 kbps to 4 Mbps in FIG. 6. After limiting the selection candidates in this manner, the mapping control section 313 maps the four patterns of transmission rates of 64 kbps, 256 kbps, 1 Mbps, and 4 Mbps, onto two bits of '11', '10', '01', and '00', respectively. Then, the mapped four patterns of transmission rate candidates are inputted to the transmission rate selection section 312.

In this way, according to this embodiment, by limiting the selection candidates of transmission rates by puncturing the selection candidates of transmission rates intermittently, the number of bits of transmission rate information can be reduced to thereby reduce transmission power of the downlink control signal while substantially maintaining the range of selectable transmission rates.

Embodiment 3

In this embodiment, a case will be described in which a plurality of communication terminals existing in a cell are divided into a plurality of groups and an identical transmission rate is reported to the communication terminals belonging to each group.

Figure 7A:
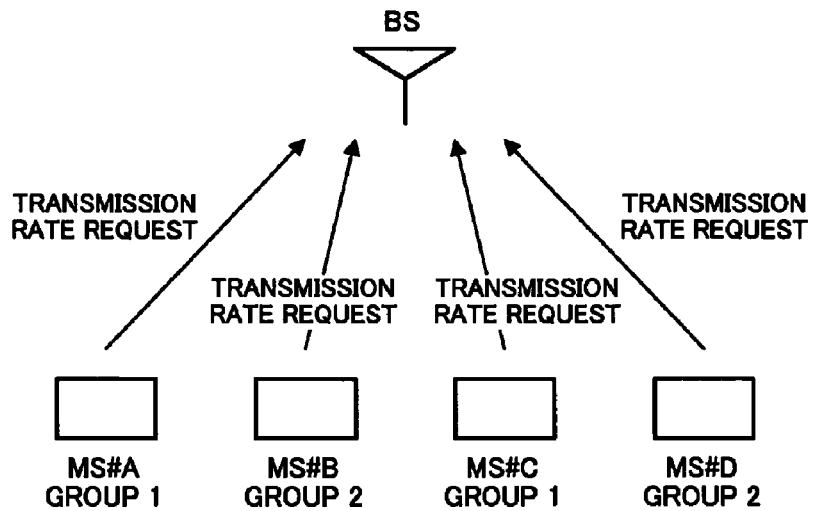
FIG. 7A is a view for explaining a scheduling method according to Embodiment 3 of the present invention.
Figure 7B:
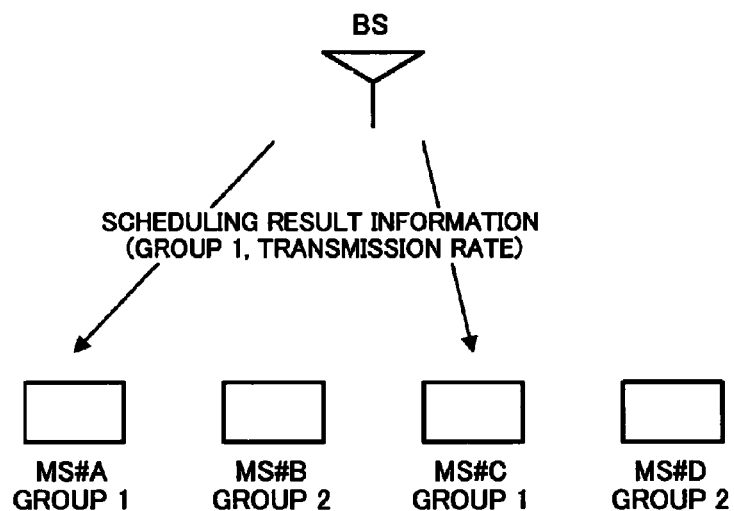
FIG. 7B is a view for explaining the scheduling method according to Embodiment 3 of the present invention.
Figure 7C:
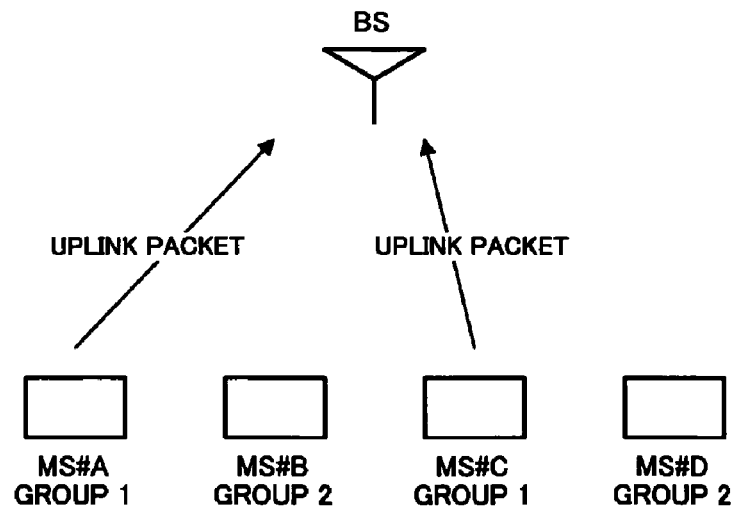
FIG. 7C is a view for explaining the scheduling method according to Embodiment 3 of the present invention.

When a plurality of communication terminals existing in a cell are divided into a plurality of groups, the scheduling will be carried out by the following three steps, as shown in FIG. 7A to FIG. 7C. In addition, in FIG. 7A to FIG. 7C, there is shown an example in which four communication terminals of a communication terminal (MS) #A to a communication terminal #D are divided into group 1 (communication terminals # A and #C) and group 2 (communication terminals #B and #D). First, in the first step, the communication terminals #A to #D issue a transmission rate request to a base station (FIG. 7A).

Next, in the second step, the base station (BS) carries out scheduling based on the transmission rate request reported from the communication terminals #A to #D, and selects the communication terminals, which are allowed to transmit an uplink packet, in the unit of group, and transmits common scheduling result information to all the communication terminals belonging to the selected group (FIG. 7B). Here, assume group 1 is selected. Then, in the third step, the communication terminals (i.e., the communication terminals #A and #C) which received a control signal addressed to the communication terminal transmits an uplink packet at a transmission rate lower than the transmission rate indicated by the base station (FIG. 7C).

In this way, when transmitting one scheduling result information to a grouped plurality of communication terminals, the transmission of an uplink packet is allowed to a plurality of communication terminals, simultaneously. That is, a plurality of communication terminals will use the received power resources for the uplink in the base station, simultaneously. Moreover, the received power resources for the uplink in the base station have an upper limit, like the downlink. Accordingly, when transmitting one scheduling result information to a grouped plurality of communication terminals, a relatively low transmission rate is selected for the respective communication terminals. That is, when the communication terminals are grouped, it is less likely that a high transmission rate is selected in the transmission rate selection section 312, and therefore excluding higher transmission rates from the selection candidates would have little effect.

Then, in this embodiment, as shown in FIG. 8, the mapping control section 313 limits the candidates of transmission rates to four patterns of transmission rates in ascending order from the lower ones among eight patterns of transmission rates indicated by the transmission rate combination information. That is, the mapping control section 313 limits the candidates of transmission rates to four patterns of transmission rates from 32 kbps to 256 kbps among eight patterns of transmission rates from 32 kbps to 4 Mbps indicated by the transmission rate combination information. Then, the mapping control section 313 maps the four patterns of transmission rates from 32 kbps to 256 kbps onto two bits of '11' to '00', respectively. Then, the mapped four patterns of transmission rate candidates are inputted to the transmission rate selection section 312.

In this way, according to this embodiment, like in Embodiment 1, the patterns of transmission rates which can be reported to a communication terminal is reduced from eight patterns to four patterns to thereby reduce the number of bits of the transmission rate information from three bits to two bits, and therefore transmission power of the downlink control signal can be reduced. Accordingly, the consumption of transmission power resources for the downlink can be suppressed.

Embodiment 4

In this embodiment, a case will be described in which the candidates of transmission rates are limited corresponding to the capability of the communication terminal. In addition, the capability of the communication terminal is defined by, for example, the maximum transmission rate at which the communication terminal can communicate, the maximum data length, the maximum number of codes, the lowest spreading factor, the pattern of a TTI (Transmission Time Interval) length currently supported, and so on.

Figure 9:
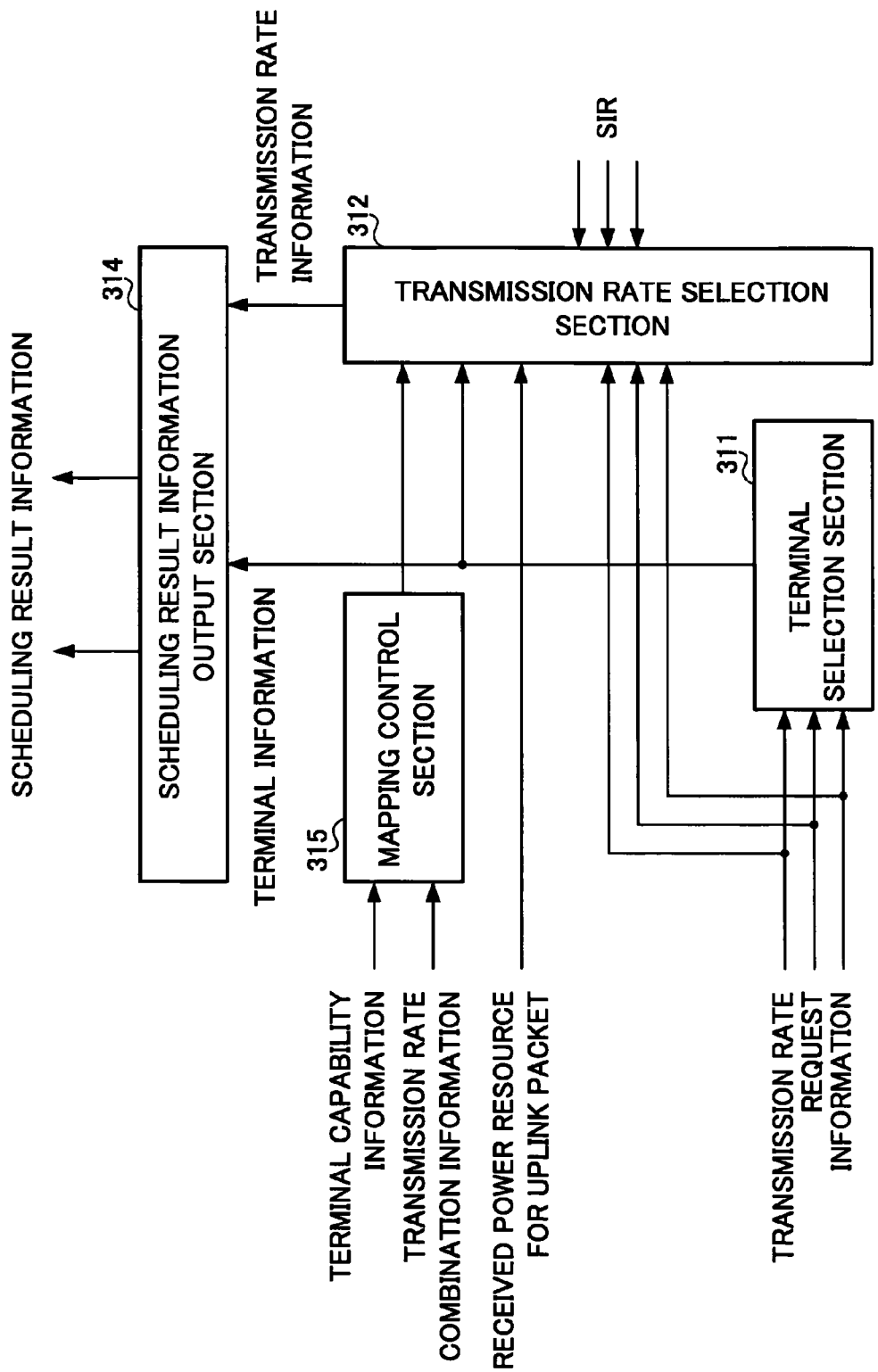
FIG. 9 is a block diagram showing a configuration of a scheduling section according to Embodiment 4 of the present invention.

FIG. 9 is a block diagram showing a configuration of a scheduling section of a wireless base station apparatus according to Embodiment 4 of the present invention. In addition, in FIG. 9, for the same configuration as that of FIG. 3 (Embodiment 1), the same numerals will be given and the descriptions thereof will be omitted.

To a mapping control section 315, transmission rate combination information is inputted. Moreover, to the mapping control section 315, terminal capability information indicating the capability of a communication terminal which transmitted transmission rate request information is inputted. This terminal capability information indicates up to which transmission rate the communication terminal is capable of transmitting. For example, if the communication terminal #A is capable of transmitting up to 4 Mbps (4 Mbps terminal), the terminal capability information on the communication terminal #A is '4 Mbps', and, if the communication terminal #B is capable of transmitting up to 1 Mbps (1 Mbps terminal), the terminal capability information on the communication terminal #B is '1 Mbps'. Then, based on the terminal capability information, the mapping control section 315 limits the candidates of transmission rates, which may be selected in the transmission rate selection section 312, to part of a plurality of transmission rates indicated by the transmission rate combination information. Specifically, the limiting is carried out as follows.

For example, if the communication terminal #A is a 4 Mbps terminal and the communication terminal #B is a 1 Mbps terminal, the mapping control section 315 limits the selection candidates of transmission rates, with the transmission rate indicated by the terminal capability information of each communication terminal being the maximum rate, as shown in FIG. 10. In an example shown in FIG. 10, for the communication terminal #A (4 Mbps terminal), the selection candidates of transmission rates are limited to four transmission rates (4 Mbps, 2 Mbps, 1 Mbps, 512 kbps), with 4 Mbps being the maximum rate. Moreover, for the communication terminal #B (1 Mbps terminal), the selection candidates of transmission rates are limited to four transmission rates (1 Mbps, 512 kbps, 256 kbps, 128 kbps), with 1 Mbps being the maximum rate. In this way, in this embodiment, the limited candidates of transmission rates are different corresponding to the capability of the communication terminal.

Moreover, the mapping of the limited transmission rates is also different corresponding to the capability of a communication terminal. That is, in FIG. 10, for both of the communication terminal #A (4 Mbps terminal) and communication terminal #B (1 Mbps terminal), the transmission rates of 1 Mbps and 512 kbps can be selected. However, in case of the communication terminal #A (4 Mbps terminal), 1 Mbps is mapped onto '10' and 512 kbps is mapped onto '11', whereas in case of the communication terminal #B (1 Mbps terminal), 1 Mbps is mapped onto '00' and 512 kbps is mapped onto '01'.

In addition, in the mapping control section 315, as shown in FIG. 11, for the communication terminal #A (4 Mbps terminal), the selection candidates of transmission rates are limited to four transmission rates (4 Mbps, 2 Mbps, 1 Mbps, 512 kbps) with 4 Mbps being the maximum rate, whereas, for the communication terminal #B (1 Mbps terminal), the selection candidates of transmission rates are limited to two transmission rates (1 Mbps, 512 kbps) with 1 Mbps being the maximum rate, whereby the number of the limited transmission rates may be different corresponding to the capability of the communication terminal. In this case, it is preferable that the lower terminal capability, the fewer number of limited transmission rates.

In this way, according to this embodiment, because the selectable transmission rates are different corresponding to the capability of the communication terminal and the selection candidates of transmission rates are limited, transmission power of the downlink control signal can be reduced by reducing the number of bits of transmission rate information, and the appropriate transmission rates corresponding to the capability of the communication terminal can be reported to each communication terminal.

Embodiment 5

In this embodiment, a case will be described in which the limited candidates of transmission rates can be switched during communication.

Figure 12:
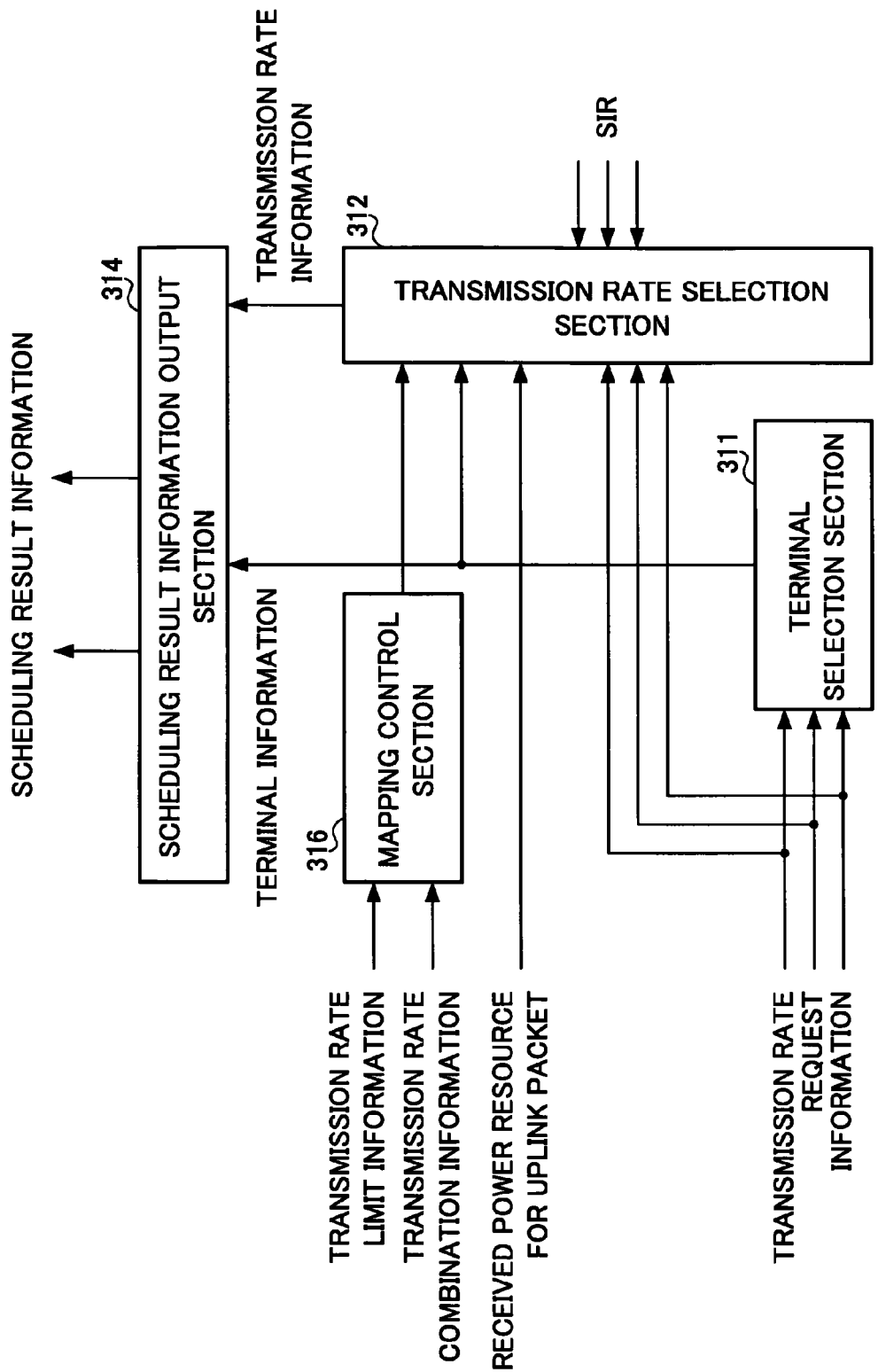
FIG. 12 is a block diagram showing a configuration of a scheduling section according to Embodiment 5 of the present invention.

FIG. 12 is a block diagram showing a configuration of a scheduling section of a wireless base station apparatus according to Embodiment 5 of the present invention. In addition, in FIG. 12, for the same configuration as that of FIG. 3 (Embodiment 1), the same numerals will be given and the descriptions thereof will be omitted.

To a mapping control section 316, transmission rate combination information is inputted. Moreover, to the mapping control section 316, transmission rate limit information is inputted. In addition, the transmission rate limit information is reported from a higher control station, during communication of the base station. The control station switches and reports the content of the transmission rate limit information suitably corresponding to the communication conditions, such as the number of communication terminals currently accommodated in the wireless communication system, the amount of interference, the user's throughput of the uplink or the downlink, the system throughput, and the traffic volume (for example, the data amount in the buffer) Then, the mapping control section 316 limits the candidates of transmission rates, which may be selected in the transmission rate selection section 312, to the transmission rates indicated by the transmission rate limit information among a plurality of transmission rates indicated by the transmission rate combination information, every time the transmission rate limit information reported from the control station during communication of the base station is inputted. That is, based on the transmission rate limit information, the mapping control section 316 limits the candidates of transmission rates, which may be selected in the transmission rate selection section 312, to part of a plurality of transmission rates indicated by the transmission rate combination information. Then, the mapping control section 316 converts the limited candidates of transmission rates into bits, respectively, and maps them and inputs the mapped bits to the transmission rate selection section 312. Specifically, the following is carried out.

To the mapping control section 316, the transmission rate limit information shown in (a) to (c) of FIG. 13, which the control station switches and reports suitably, is inputted. This transmission rate limit information is the information which limits the candidates of transmission rates, which may be selected in the transmission rate selection section 312, to part of a plurality of transmission rates indicated by the transmission rate combination information (the transmission rate to be a selection candidate is expressed as 'YES', and the transmission rate not to be a selection candidate is expressed as 'NO'). Moreover, because the candidates of transmission rates indicated by the transmission rate limit information are provided in four patterns or three patterns in the example of (a) to (c) of FIG. 13, two bits (22) are needed in order to express with a bit sequence. In this way, the number of bits of the transmission rate candidates indicated by the transmission rate limit information is made to be less than the number of bits of the transmission rates indicated by the transmission rate combination information.

Then, if the transmission rate limit information shown in (a) of FIG. 13 is inputted, the mapping control section 316 limits the candidates of transmission rates to four patterns of transmission rates from 256 kbps to 2 Mbps among eight patterns of transmission rates from 32 kbps to 4 Mbps indicated by the transmission rate combination information. Then, the mapping control section 316 maps the four patterns of transmission rates from 256 kbps to 2 Mbps onto two bits of '11' to '00', respectively. Then, the mapped four patterns of transmission rate candidates are inputted to the transmission rate selection section 312.

Moreover, if the transmission rate limit information shown in (b) of FIG. 13 is inputted, the mapping control section 316 limits the candidates of transmission rates to four patterns of transmission rates from 128 kbps to 1 Mbps among eight patterns of transmission rates from 32 kbps to 4 Mbps indicated by the transmission rate combination information. Then, the mapping control section 316 maps the four patterns of transmission rates from 128 kbps to 1 Mbps onto two bits of '11' to '00', respectively. Then, the mapped four patterns of transmission rate candidates are inputted to the transmission rate selection section 312.

Moreover, if the transmission rate limit information shown in (c) of FIG. 13 is inputted, the mapping control section 316 limits the candidates of transmission rates to three patterns of transmission rates from 256 kbps to 1 Mbps among eight patterns of transmission rates from 32 kbps to 4 Mbps indicated by the transmission rate combination information. Then, the mapping control section 316 maps the three patterns of transmission rates from 256 kbps to 1 Mbps onto two bits of '11', '10', and '01', respectively. Then, the mapped three patterns of transmission rate candidates are inputted to the transmission rate selection section 312.

In this way, according to this embodiment, because the content of transmission rate limit information is switched suitably corresponding to communication conditions, such as the number of communication terminals and amount of interference which change during communication, and are reported to the base station from a control station, the limited candidates of transmission rates can be switched suitably during communication in the base station, and, as a result, transmission power of the downlink control signal can be reduced by reducing the number of bits of the transmission rate information, and the appropriate transmission rates corresponding to the communication conditions can be reported to each communication terminal.

Embodiment 6

In this embodiment, a case will be described in which the limited candidates of transmission rates corresponding to the destination of the transmission rate information are different.

Figure 14:
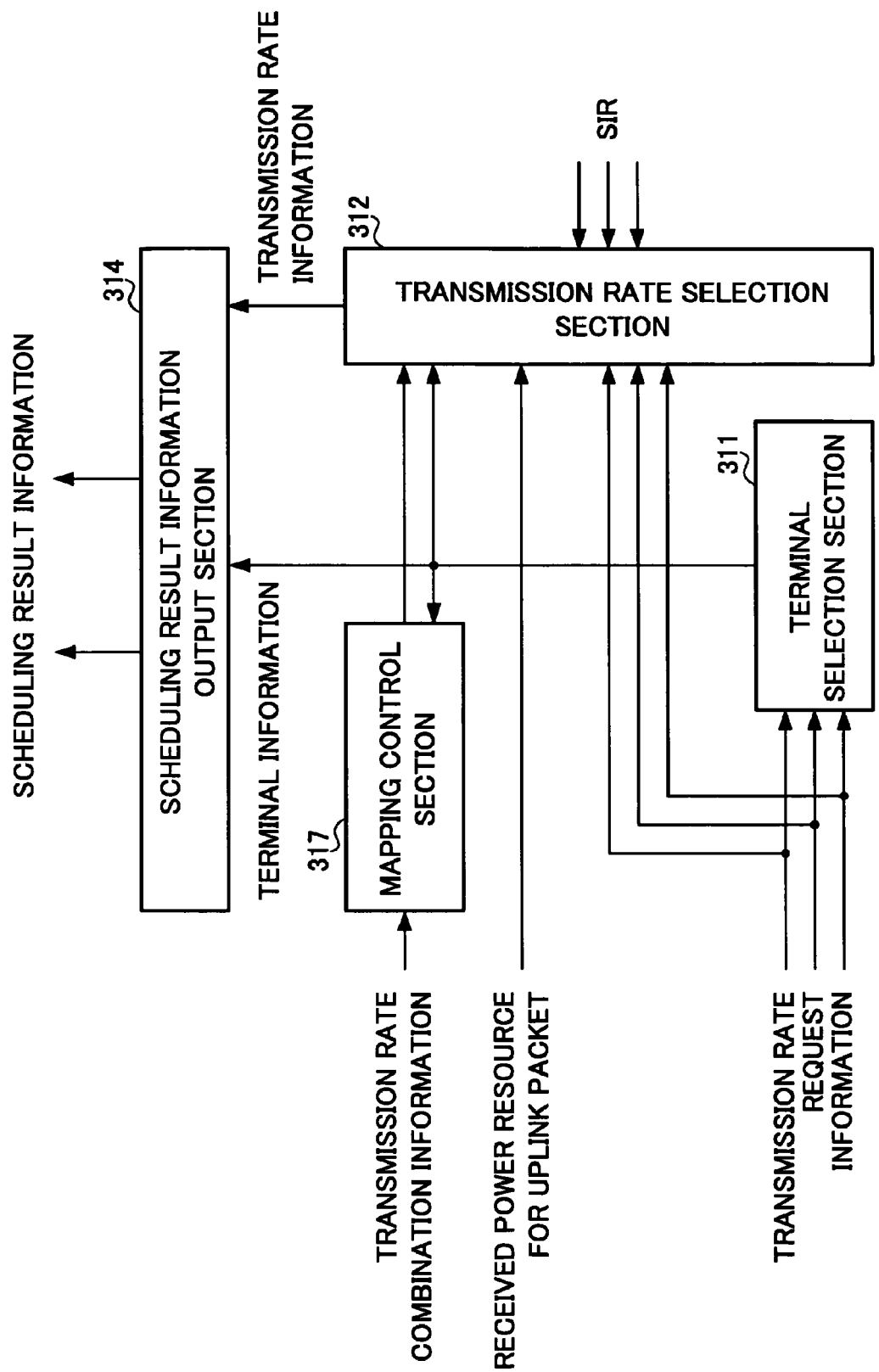
FIG. 14 is a block diagram showing a configuration of a scheduling section according to Embodiment 6 of the present invention.

FIG. 14 is a block diagram showing a configuration of a scheduling section of a wireless base station apparatus according to Embodiment 6 of the present invention. In addition, in FIG. 14, for the same configuration as that of FIG. 3 (Embodiment 1), the same numerals will be given and the descriptions thereof will be omitted.

To a mapping control section 317, transmission rate combination information is inputted. Moreover, to the mapping control section 317, terminal information is inputted from the terminal selection section 311. The terminal information is information indicating the destination of the transmission rate information while it is information indicating the communication terminal which is allowed to transmit an uplink packet. Moreover, in the case where a plurality of communication terminals existing in a cell are grouped like in Embodiment 3, and the communication terminals which are allowed to transmit an uplink packet are selected in the unit of group, the terminal information becomes information (for example, a group number) identifying the group which was selected in the terminal selection section 311. On the other hand, even in the case where a plurality of communication terminals are not grouped or in the case where a plurality of communication terminals are grouped, when selecting a communication terminal, which is allowed to transmit an uplink packet, in the unit of communication terminal, the terminal information becomes information (for example, a terminal number) identifying the communication terminal which was selected in the terminal selection section 311. That is, the destination of transmission rate information may be information which identifies each communication terminal, or may be information which identifies a group to which each communication terminal belongs.

Figure 15:
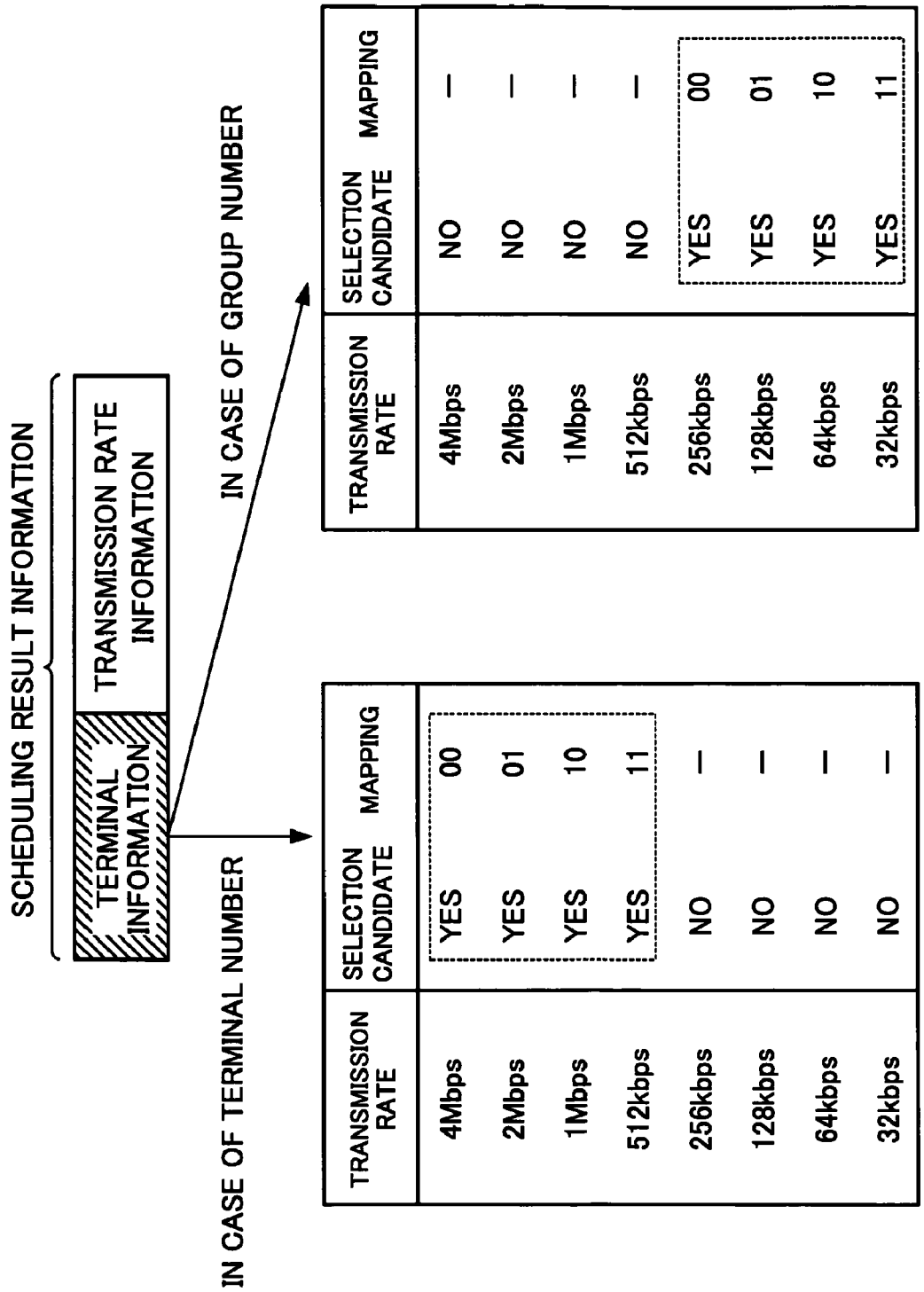
FIG. 15 is a view for explaining the scheduling section according to Embodiment 6 of the present invention.

Then, as shown in FIG. 15, the mapping control section 317 changes the limited candidates of transmission rates, corresponding to the terminal information (i.e., information indicating the destination of a transmission rate information) inputted from the terminal selection section 311. That is, when a terminal number is inputted as the destination from the terminal selection section 311, the mapping control section 317 limits the candidates of transmission rates to four patterns of transmission rates in descending order from higher ones among eight patterns of transmission rates indicated by the transmission rate combination information. On the other hand, when a group number is inputted as the destination from the terminal selection section 311, the mapping control section 317 limits the candidates of transmission rates to four patterns of transmission rates in ascending order from lower ones among eight patterns of transmission rates indicated by the transmission rate combination information.

In this way, in this embodiment, because the limited candidates of transmission rates are different between a case where the destination of transmission rate information is a terminal number and a case where it is a group number, the appropriate transmission rate candidates can be limited corresponding to the respective cases. Moreover, because the format of the scheduling result information can be standardized between a case where the destination of the transmission rate information is a terminal number and a case where it is a group number, the communication terminal can demodulate the scheduling result information by the same demodulation method between a case where the destination of the transmission rate information is a terminal number and a case where it is a group number, and therefore, a plurality of communication terminals can be grouped without complicating the demodulation process in the communication terminal.

In addition, although in the above embodiments cases where the selectable transmission rates are limited have been described, the invention can be implemented similarly also in cases where selectable transmission powers for the transmission power of an uplink packet are limited. For example, the selection candidates of transmission powers may be limited to two patterns of 22 dBm and 20 dBm among eight patterns of transmission powers of 22 dBm, 20 dBm, 18 dBm, 16 dBm, 14 dBm, 12 dBm, 10 dBm, and 8 dBm, so that the transmission rate corresponding to either one of the two patterns of transmission powers of 22 dBm and 20 dBm is selected.

Moreover, although in the above embodiments the cases where the selectable transmission rates are limited have been described, the invention can be implemented similarly also in limiting the selectable transmission power offsets regarding the transmission power offsets of the uplink packet channel for other channels, such as a dedicated channel (e.g., a transmission power offset of E-DPDCH for DPCCH, a transmission power offset of DPDCH and E-DPDCH for PCCH, or a transmission power offset of the channels other than DPCCH for DPCH). For example, among eight patterns of transmission power offsets (30 dB, 25 dB, 20 dB, 15 dB, 10 dB, 5 dB, 0 dB, -5 dB), the selection candidates of transmission power offsets are limited to four patterns, as shown in FIG. 16 or FIG. 17. That is, if there is no limitation they may be limited to four patterns of 30 dB, 25 dB, 20 dB, and 15 dB, if there is a limitation of up to 25 dB they may be limited to four patterns of 25 dB, 20 dB, 15 dB, and 10 dB, and if there is a limitation of up to 20 dB they may be limited to four patterns of 20 dB, 15 dB, 10 dB, and 5 dB, so that a transmission rate corresponding to any one of these four patterns of transmission power offset candidates may be selected. In addition, although in this example the step width of transmission power offsets is set to 5 dB, the step width is not limited thereto. Moreover, although the transmission power offset is expressed in the unit of dB, it may be expressed with a true value. Moreover, it may be expressed with the amplitude ratio instead of the power ratio.

Embodiment 7

In this embodiment, a case will be described in which the data length of a transmission packet is used as transmission rate information, and the selection candidates of data lengths, which are reported to a base station from a communication terminal, are limited corresponding to the capability of the communication terminal. In addition, the data length of a transmission packet is reported from the communication terminal to a base station as the transmission rate information because in the base station apparatus which receives this packet, the data length is more convenient than the transmission rate in decoding the packet. In addition, the data length may contain an error detection code, such as CRC bits.

Figure 18:
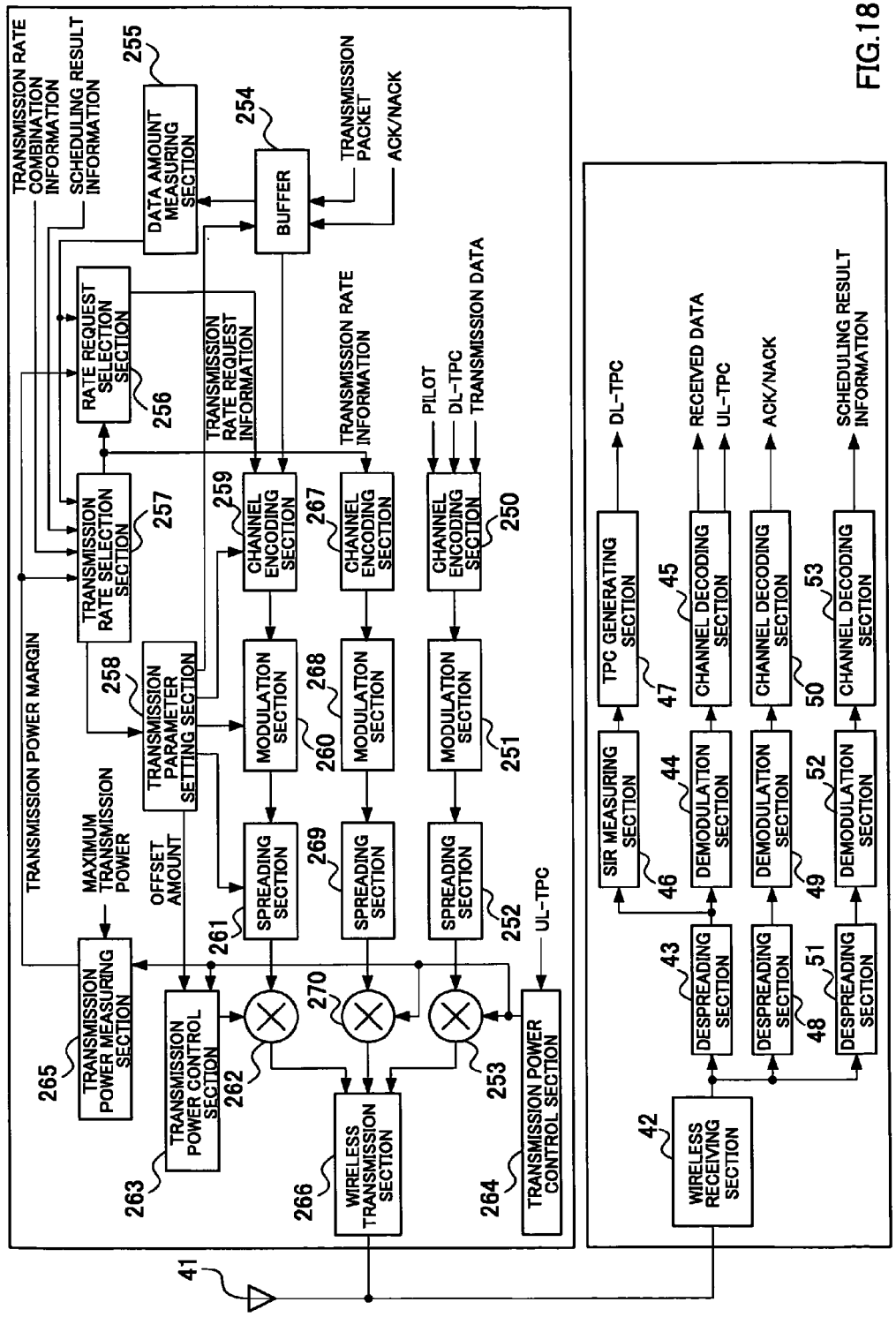
FIG. 18 is a block diagram showing a configuration of a communication terminal according to Embodiment 7 of the present invention.

FIG. 18 is a block diagram showing a configuration of a communication terminal according to Embodiment 7 of the present invention. In addition, in FIG. 18, for the same configuration as that of FIG. 2 (Embodiment 1), the same numerals will be given and the descriptions thereof will be omitted.

The transmission rate selection section 257 selects the data length of an uplink packet which is actually to be transmitted, and reports the selected data length to the rate request selection section 256 and the transmission parameter setting section 258. Moreover, the transmission rate selection section 257 generates transmission rate information indicating this selected data length and outputs this to a channel encoding section 267. This transmission rate information is encoded in the channel encoding section 267, modulated in a modulation section 268, spread in a spreading section 269, amplified in an amplifying section 270, and undergoes predetermined wireless processings such as a digital-to-analog conversion and an up-conversion by a wireless transmission section 266, and thereafter the result is transmitted to a base station via the antenna 41.

Figures 19, 20:
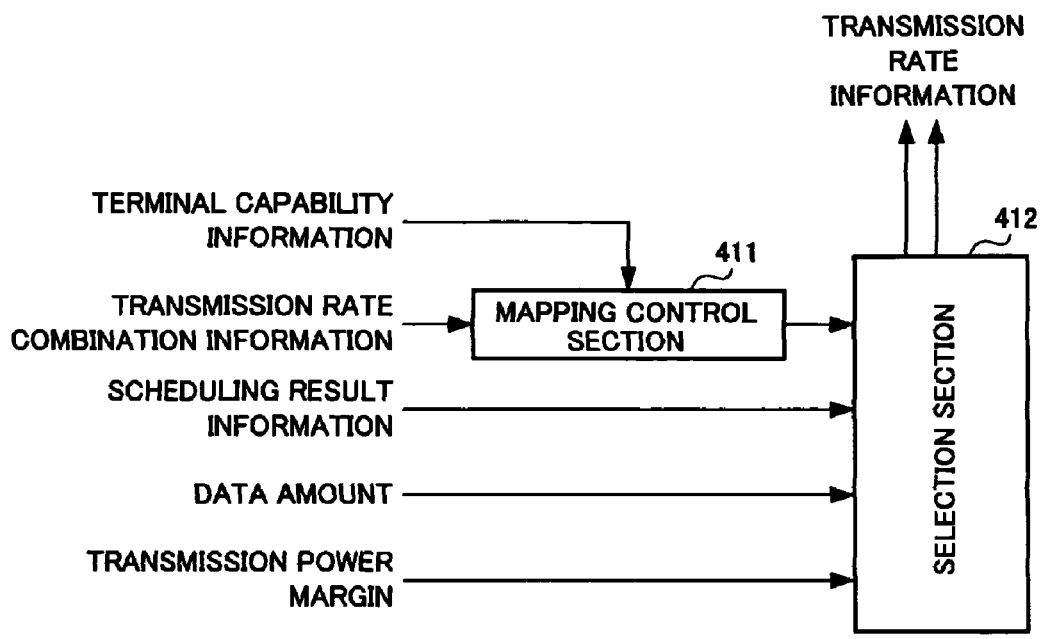
FIG. 19 is a block diagram showing a configuration of a transmission rate selection section according to Embodiment 7 of the present invention.
FIG. 20 is transmission rate combination information according to Embodiment 7 of the present invention.

Next, the transmission rate selection section 257 of the communication terminal shown in FIG. 18 will be described. FIG. 19 is a block diagram showing a configuration of a transmission rate selection section of the communication terminal according to Embodiment 7 of the present invention.

To a mapping control section 411, transmission rate combination information indicating a combination of a plurality of data lengths which can be taken as the data length of an uplink packet is inputted. In addition, the transmission rate combination information may be specific to the mobile communication system, or may be the one stored somewhere in the communication terminal apparatus, or may be the one reported via a base station from a higher control station. Moreover, to the mapping control section 411, the terminal capability information indicating the capability of the communication terminal shown in FIG. 18 is inputted. Then, based on the terminal capability information, the mapping control section 411 limits the candidates of data lengths, which may be selected in the selection section 412, to part of the plurality of data lengths indicated by the transmission rate combination information. Then, the mapping control section 411 converts the limited candidates of data lengths into bits, respectively, maps them and inputs the mapped bits to the selection section 412. In addition, a more specific operation of the mapping control section 411 will be described later.

To the selection section 412, the scheduling result information, data amount of a transmission packet, and transmission power margin are inputted. Moreover, to the selection section 412, the mapped bits (i.e., the limited candidates of data lengths) are inputted from the mapping control section 411. The selection section 412 selects one data length out of the candidates of data lengths, which are limited in the mapping control section 411, as the data length of an uplink packet to be transmitted. Here, the selection section 412 selects one data length based on the scheduling result information, data amount, and transmission power margin. Then, the selection section 412 outputs the transmission rate information indicating the selected data length, to the transmission parameter setting section 258, rate request selection section 256, and channel encoding section 267. Then, the transmission rate information outputted to the channel encoding section 267 is reported to a base station apparatus as a control signal which indicates the data length of the uplink packet transmitted from the communication terminal apparatus.

In addition, although in the above description the configurations in which only transmission rate information is inputted to the channel encoding section 267 have been shown, other information may be inputted and encoded along with the transmission rate information. For example, when HARQ (Hybrid Automatic Repeat reQuest) is applied, control information related to HARQ (number of transmissions, an index of new data, redundancy version of IR, and so on) may be encoded along with the transmission rate information and be transmitted to a base station apparatus.

Next, a more specific operation of the mapping control section 411 will be described.

First, to the mapping control section 411, the transmission rate combination information shown in FIG. 20 is inputted. In the transmission rate combination information shown in FIG. 20, for example, twelve patterns of data lengths from N bits to 128N bits are shown as the combination of data lengths which can be taken as the data length of an uplink packet. That is, in this mobile communication system, twelve patterns of data lengths from N bits to 128N bits can be used as the data length of the uplink packet. Therefore, in the transmission rate combination information, all the twelve patterns of data lengths are defined as the selection candidate (the data length to be a selection candidate is expressed as 'YES'). Moreover, because there are twelve patterns of data lengths indicated by the transmission rate combination information, four bits ($2^4$) are needed in order to express with a bit sequence, as shown in FIG. 20. Then, the twelve patterns of data lengths from N bits to 128N bits are mapped onto four bits of '0000' to '1011', respectively. In addition, in the data length, N indicates a predetermined number of bits to be a reference, and, for example, the data length of 2N indicates a data length where the number of bits is twice the reference number of bits.

Here, the terminal capability information of the present embodiment indicates up to which data length the communication terminal is capable of transmitting. For example, if the communication terminal #A is a communication terminal capable of transmitting up to 128N bits (a high capability terminal), the terminal capability information of the communication terminal #A is '128N bits', and if the communication terminal #B is a communication terminal capable of transmitting up to 32N bits (a low capability terminal), the terminal capability information of the communication terminal #B is '32N bits'. Then, based on the terminal capability information, the mapping control section 411 limits the candidates of data lengths, which may be selected in the selection section 412, to part of the plurality of data lengths indicated by the transmission rate combination information. Specifically, the limiting is carried out as follows.

For example, when the communication terminal #A is a high capability terminal and the communication terminal #B is a low capability terminal, the mapping control section 411 limits the selection candidates of data lengths, with the data length indicated by the terminal capability information of each communication terminal being the maximum data length, as shown in FIG. 21. In an example shown in FIG. 21, according to the communication terminal #A (high capability terminal), the selection candidates of data lengths are limited to eight data lengths (128N bits, 64N bits, 32N bits, 24N bits, 16N bits, 12N bits, 8N bits, 6N bits), with 128N bits being the maximum data length. Moreover, according to the communication terminal #B (low capability terminal), the selection candidates of data lengths are limited to eight data lengths (32N bits, 24N bits, 16N bits, 12N bits, 8N bits, 6N bits, 4N bits, 3N bits), with 32N bits being the maximum data length. In this way, in this embodiment, the maximum value of the data lengths to be selection candidates and the limited candidates of data lengths are different corresponding to the capability of the communication terminal.

Moreover, the mapping of the limited data lengths is also different corresponding to the capability of the communication terminal. That is, in FIG. 21, the data lengths from 6N bits to 32N bits are selectable for both of the communication terminal #A (high capability terminal) and communication terminal #B (low capability terminal). However, in case of the communication terminal #A (high capability terminal), for example, 32N bits are mapped onto '101' and 24N bits are mapped onto '100', whereas, in case of the communication terminal #B (low capability terminal), 32N bits are mapped onto '111' and 24N bits are mapped onto '110'. Then, the mapping control section 411 inputs the candidates of the mapped eight patterns of data lengths to the selection section 412, and in the selection section 412, one data length is selected out of the candidates of these eight patterns of data lengths to be served as the transmission rate information.

In addition, in the mapping control section 411, as shown in FIG. 22, the selection candidates of data lengths may be limited intermittently, with the data length indicated by the terminal capability information of each communication terminal being the maximum data length.

Moreover, the communication terminal may switch the capability of the communication terminal suitably corresponding to the communication conditions.

In this way, according to this embodiment, the data length of a transmission packet is used as transmission rate information, and the patterns of data lengths which can be reported to a base station apparatus are reduced from twelve patterns to eight patterns to thereby reduce the number of bits of the transmission rate information from four bits to three bits, and therefore the transmission power of the uplink control signal can be reduced. Accordingly, the consumption of transmission power resources for the uplink can be suppressed. Moreover, because the selectable data lengths are different corresponding to the capability of the communication terminal and the selection candidates of data lengths are limited, the appropriate data lengths corresponding to the capability of the communication terminal can be reported to a base station apparatus.

Embodiment 8

As the TTI of an uplink packet becomes shorter, the data length which can be transmitted in one packet becomes shorter. On the other hand, as the TTI of an uplink packet becomes longer, the data length which can be transmitted in one packet becomes longer. Therefore, in case of a relatively short TTI, even if a long data length which cannot be transmitted in this short TTI is prepared as a selection candidate, it is unlikely that such a long data length is ever selected. In this way, the data lengths appropriate as the selection candidates are different corresponding to the TTI. So, in this embodiment, the candidates of data lengths reported from the communication terminal to a base station are limited corresponding to the TTI.

Figures 23, 24:
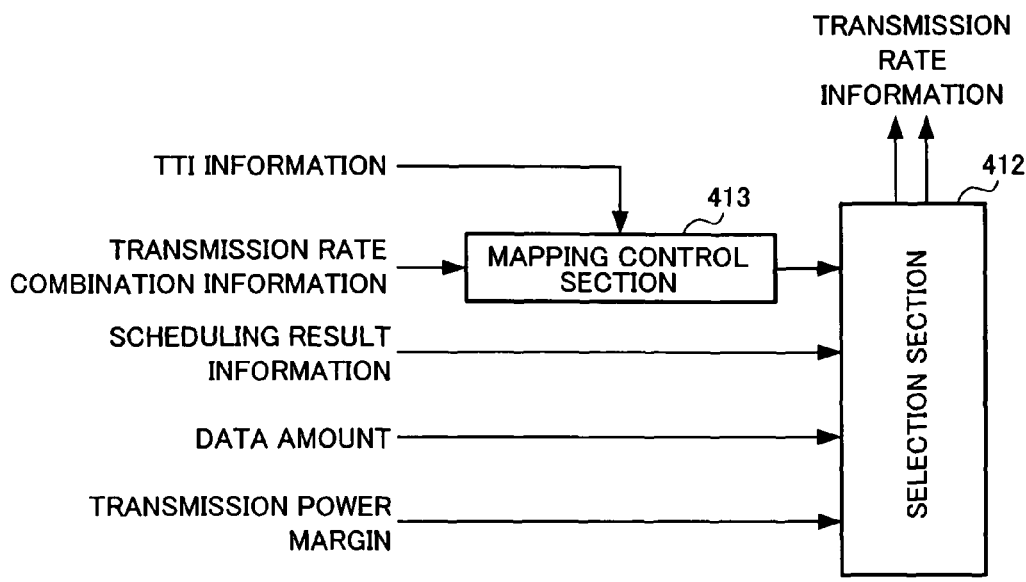
FIG. 23 is a block diagram showing a configuration of a transmission rate selection section according to Embodiment 8 of the present invention.
FIG. 24 is a view for explaining the transmission rate selection section according to Embodiment 8 of the present invention.

FIG. 23 is a block diagram showing a configuration of a transmission rate selection section of a communication terminal according to Embodiment 8 of the present invention. In addition, in FIG. 23, for the same configuration as that of FIG. 19 (Embodiment 7), the same numerals will be given and the descriptions thereof will be omitted.

To a mapping control section 413, like in the above description, transmission rate combination information shown in FIG. 20 is inputted. Moreover, to the mapping control section 413, TTI information indicating a TTI to be used is inputted. Then, as shown in FIG. 24, based on the TTI information, the mapping control section 413 limits the candidates of data lengths, which may be selected in the selection section 412, to part of the plurality of data lengths indicated by the transmission rate combination information.

That is, when a TTI indicated by the TTI information is longer than a predetermined value (in case of a long TTI), as shown in FIG. 24, the selection candidates of data lengths are limited to eight data lengths (128N bits, 64N bits, 32N bits, 24N bits, 16N bits, 12N bits, 8N bits, 6N bits), with the data length of 128N bits being the maximum data length. Moreover, when a TTI indicated by the TTI information is shorter than a predetermined value (in case of a short TTI), as shown in FIG. 24, the selection candidates of data lengths are limited to eight data lengths (24N bits, 16N bits, 12N bits, 8N bits, 6N bits, 4N bits, 3N bits, 2N bits), with the data length of 24N bits being the maximum data length. In this way, in this embodiment, the maximum value of the data lengths to be selection candidates and the limited candidates of data lengths are different corresponding to TTI.

Moreover, the mapping of the limited data lengths is also different corresponding to TTI. That is, in FIG. 24, the data lengths from 6N bits to 24N bits are selectable for both cases of a long TTI and a short TTI. However, in case of a long TTI, for example, 24N bits are mapped onto '100' and 16N bits are mapped onto '011', whereas, in case of a short TTI, 24N bits are mapped onto '111' and 16N bits are mapped onto '110'.

Then, the mapping control section 413 inputs the candidates of the mapped eight patterns of data lengths to the selection section 412, and in the selection section 412, one data length is selected out of the candidates of these eight patterns of data lengths to be served as transmission rate information.

In addition, in the mapping control section 413, as shown in FIG. 25, the maximum data length may be set corresponding to each TTI and the selection candidates of data lengths may be limited intermittently.

Moreover, this embodiment may be implemented in combination with Embodiment 7.

In this way, according to this embodiment, like in Embodiment 7, the data length of a transmission packet is used as the transmission rate information, and the patterns of data lengths which can be reported to a base station apparatus are reduced from twelve patterns to eight patterns to thereby reduce the number of bits of transmission rate information from four bits to three bits, and therefore the transmission power of the uplink control signal can be reduced. Accordingly, the consumption of transmission power resources for the uplink can be suppressed. Moreover, because the selectable data lengths are different corresponding to TTI and the selection candidates of data lengths are limited, the appropriate data lengths corresponding to the used TTI can be reported to a base station apparatus.

Embodiment 9

In this embodiment, a case will be described in which the candidates of data lengths to be reported from a communication terminal to a base station can be switched during communication of the communication terminal.

Figures 26, 27:
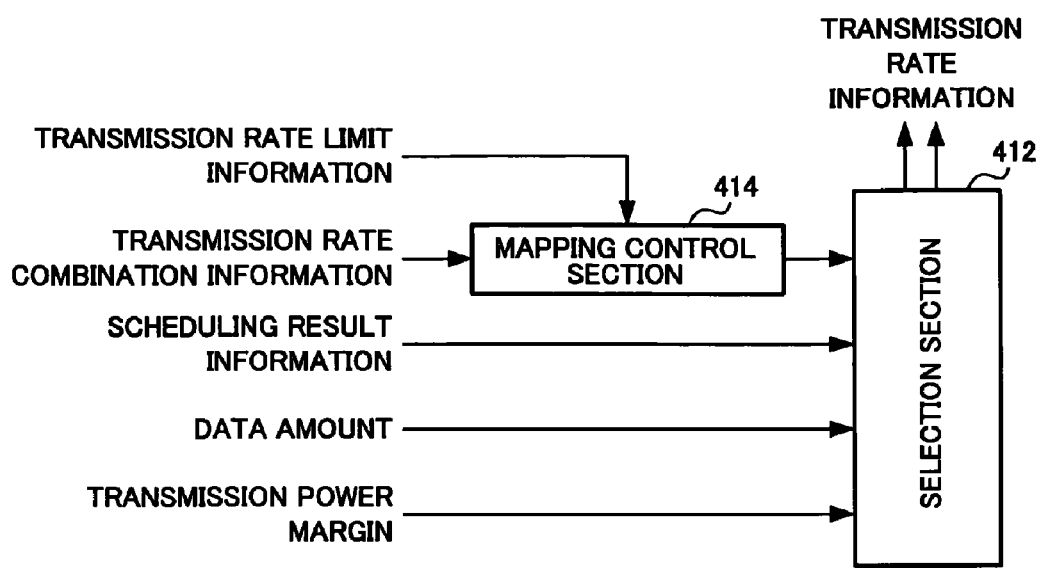
FIG. 26 is a block diagram showing a configuration of a transmission rate selection section according to Embodiment 9 of the present invention.
FIG. 27 is a view for explaining the transmission rate selection section according to Embodiment 9 of the present invention.
Figure 32:
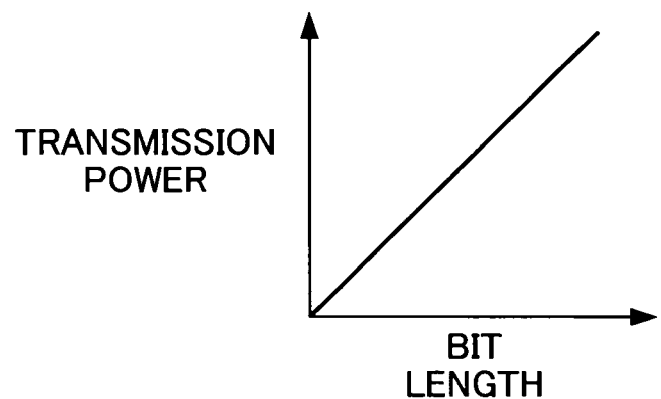
FIG. 32 is a view showing a relationship between the number of bits and transmission power.
Figure 33:
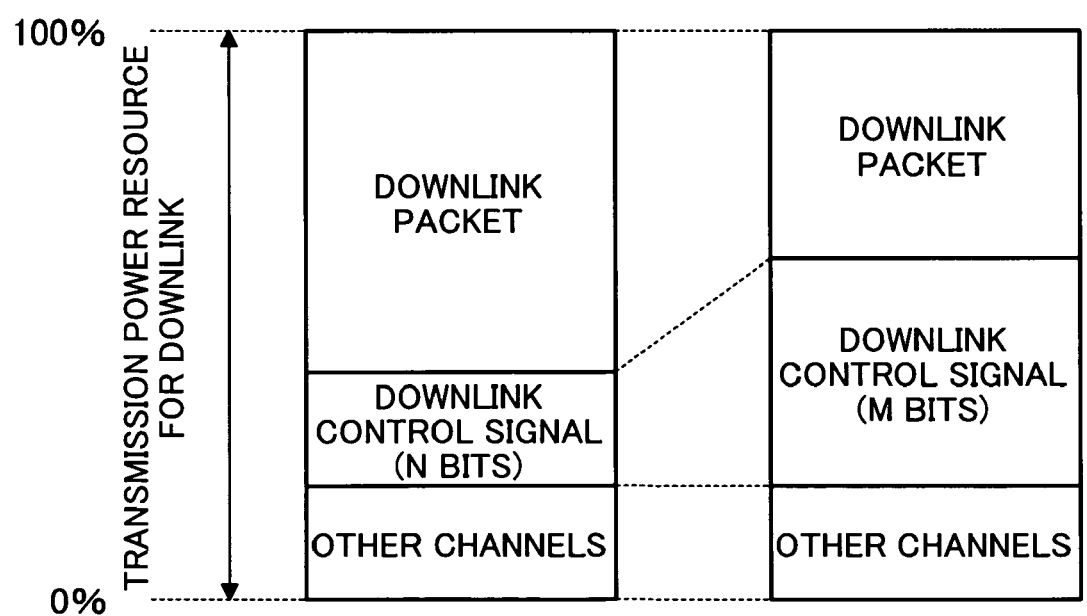
FIG. 33 is a view showing transmission power resources for the downlink.
Figure 34:
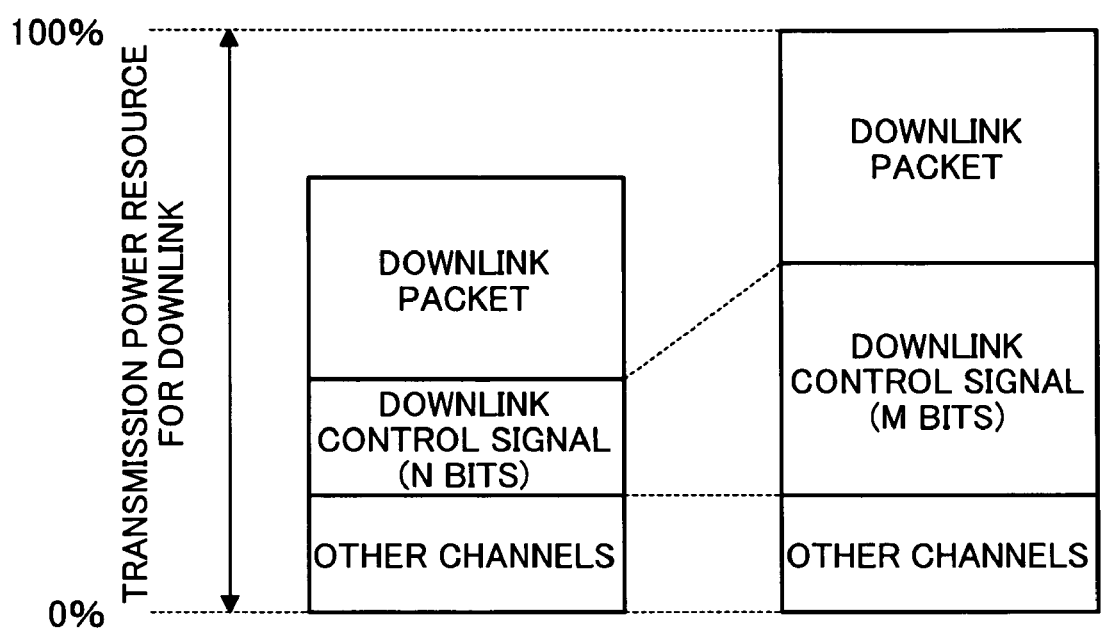
FIG. 34 is a view showing transmission power resources for the downlink.

FIG. 26 is a block diagram showing a configuration of a transmission rate selection section of a communication terminal according to Embodiment 9 of the present invention. In addition, in FIG. 26, for the same configuration as that of FIG. 19 (Embodiment 7), the same numerals will be given and the descriptions thereof will be omitted.

To a mapping control section 414, transmission rate combination information is inputted. Moreover, to the mapping control section 414, transmission rate limit information is inputted. The transmission rate limit information is reported to a communication terminal via a base station from a higher control station, during communication of the communication terminal. The control station switches the content of the transmission rate limit information corresponding to the communication conditions, such as the number of communication terminals currently accommodated in the wireless communication system, the amount of interference, the user's throughput of the uplink or the downlink, the system throughput, and the traffic volume (for example, the data amount in the buffer). Moreover, the control station may switch the content of the transmission rate limit information corresponding to the hardware usage of the base station. Moreover, when the code tree is used partially by other channels (e.g., DPDCH, DPCCH, HS-DPCCH, and so on) in the communication terminal, the control station may report, as transmission rate limit information, an upper limit of the transmission rates determined from the rest of the code tree (i.e., available code tree) excluding the code tree in use from the entirety of the code tree. Moreover, an index (for example, an MCS index) for a combination of the spreading factor and the number of codes, the index indicating the code resources for E-DPDCH, may be reported as transmission rate limit information. Moreover, the transmission rate limit information may be generated in the communication terminal apparatus. Moreover, the content of the transmission rate limit information may be different for each communication terminal, or may be different for each cell, each frequency or each operator.

Every time the transmission rate limit information reported via a base station from a control station is inputted during communication in the communication terminal, the mapping control section 414 limits the candidates of data lengths, which may be selected in the selection section 412, to the data lengths indicated by the transmission rate limit information among a plurality of transmission rates indicated by the transmission rate combination information. That is, based on the transmission rate limit information, the mapping control section 414 limits the candidates of data lengths, which may be selected in the selection section 412, to part of a plurality of data lengths indicated by the transmission rate combination information. Then, the mapping control section 414 converts the limited candidates of data lengths into bits, respectively, and maps them and inputs the mapped bits to the selection section 412. Specifically, the following is carried out.

To the mapping control section 414, the transmission rate limit information shown in FIG. 27, which the control station switches suitably and reports, is inputted. This transmission rate limit information is information for limiting the candidates of data lengths, which may be selected in the selection section 412, to part of a plurality of data lengths indicated by the transmission rate combination information (the data length to be a selection candidate is expressed as 'YES' and the data length not to be a selection candidate is expressed as 'NO'). Moreover, because the candidates of transmission rates indicated by the transmission rate limit information in the example of FIG. 27 are provided in six to eight patterns, three bits (23) are needed in order to express in a bit sequence. In this way, the number of bits of data length candidates indicated by the transmission rate limit information is made to be less than the number of bits of transmission rates indicated by transmission rate combination information.

Then, in accordance with the transmission rate limit information, for example, in case of no limitation, the mapping control section 414 limits the candidates of data lengths to eight patterns of data lengths from N bits to 4N bits, 8N bits, 16N bits, 32N bits, and 128N bits, among twelve patterns of data lengths from N bits to 128N bits indicated by the transmission rate combination information. Then, the mapping control section 414 maps these eight patterns of data lengths onto three bits of '000' to '111', respectively. Then, the mapped eight patterns of data length candidates are inputted to the selection section 412.

In addition, in the mapping control section 412, as shown in FIG. 28, the mapping of the data lengths limited in accordance with the transmission rate limit information may be different corresponding to the upper limit of available data lengths. That is, in FIG. 28, the data length of 16N bits is selectable for any one of cases of no limitation, of a limitation of up to 32N bits, and of a limitation of up to 16N bits. However, 16N bits are mapped onto '101' in case of no limitation, onto '110' in case of a limitation of up to 32N bits, and onto '111' in case of a limitation of up to 16N bits, respectively, and the mapping is different corresponding to the upper limit of available data lengths.

Moreover, although in FIG. 27 and FIG. 28 the data lengths to be excluded from the selection candidates are included, a table in which the data lengths to be excluded from the selection candidates are excluded in advance, may be provided. That is, as shown in FIG. 29, eight patterns of data lengths, which serve as the selection candidate when there is no upper limit of data lengths (in a case of no limitation), and the mapping thereof is learned in advance in the communication terminal, and then, in case of a limitation of up to 32N bits, or in case of a limitation of up to 16N bits, the candidates of data lengths may be further limited from eight patterns of data lengths in accordance with the transmission rate limit information. Moreover, as shown in FIG. 28, if the number of data lengths which are limited to be selection candidates is the same regardless of the upper limit of the data lengths (eight patterns for each case in FIG. 28) the communication terminal may change the mapping corresponding to the upper limit of the data lengths while learning in advance the mapping of the data lengths which varies corresponding to the upper limit of the available data lengths, as shown in FIG. 30. For example, if a plurality of tables (e.g., three tables of the maximum values of 128N bits, 32N bits, and 16N bits) corresponding to the maximum value of the available data lengths are defined in the communication terminal, the mapping of each data length may be different corresponding to the upper limit of the available data lengths by switching the plurality of tables in accordance with the transmission rate limit information.

Moreover, as shown in FIG. 31, also other than the upper limit of available data lengths, corresponding to the upper limit of the number of codes which can be used for the channel for an uplink packet (e.g., the number of codes available when converted into a specific spreading factor in E-DP-DCH), the candidates of data lengths may be limited and furthermore the mapping of data lengths may be different. In the same way, a table may be defined corresponding to the number of codes which are used for other channels (e.g., DPDCH, DPCCH, HS-DPCCH, and so on), peak transmission rate, the capability of the terminal, the category of the terminal, TTI, or the MCS index.

Moreover, this embodiment may be implemented in combination with Embodiment 7 or Embodiment 8.

In this way, according to the embodiments, the content of the transmission rate limit information is switched suitably corresponding to the communication conditions, such as the number of communication terminals and amount of interference, which change during communication, and are reported to a communication terminal via a base station from a control station, and therefore the limited candidates of data lengths can be switched suitably during communication in the communication terminal, and as a result, transmission power of the uplink control signal can be reduced by reducing the number of bits of the transmission rate information, while appropriate data lengths corresponding to the communication conditions can be reported to the base station apparatus.

In addition, although in the above embodiments each, a case where the transmission rate or the data length is the communication parameter to be reported to the base station or the communication terminal has been described, the kinds of communication parameters to report are not limited thereto. The present invention can be applied in a similar manner if a plurality of values are taken and these plurality of values are mapped onto a bit sequence formed by a plurality of bits, respectively, and are reported as communication parameters.

The present specification is based on Japanese Patent Application No. 2004-137265, filed May 6, 2004, and Japanese Patent Application No. 2004-308456, filed Oct. 22, 2004, the entire content of which is expressly incorporated by reference.

INDUSTRIAL APPLICABILITY

The present invention is useful especially in a wireless communication system, such as high speed packet transmission system and a wireless LAN system.

The invention claimed is:

1. A wireless communication terminal apparatus, comprising:
    a setting section that sets a specific transmission time interval (TTI) length as a TTI length to be used in a transmission of an uplink packet;
    a selector that (i) selects a specific group from among a plurality of groups each of which includes data length candidates, wherein the plurality of groups differ in correspondence to different TTI lengths, and said selector selects a group corresponding to the specific TTI length as the specific group, and (ii) selects a data length of the uplink packet from among the data length candidates included in the specific group according to the specific TTI length; and
    a transmitter that transmits data length information which shows the data length selected by said selector.

2. The wireless communication terminal apparatus according to claim 1, wherein:
    a first group in the plurality of groups corresponds to a first TTI length; and
    a second group in the plurality of groups corresponds to a second TTI length, the second TTI length being shorter than the first TTI length, and, a maximum data length candidate included in the second group being shorter than a maximum data length candidate included in the first group.

3. The wireless communication terminal apparatus according to claim 1, wherein each of the plurality of groups of data length candidates has same number of data length candidates.

4. The wireless communication terminal apparatus according to claim 1, wherein at least one group in the plurality of groups includes at least one same data length candidate as a data length candidate included in another group in the plurality of groups.

5. A wireless communication terminal apparatus, comprising:
    a setting section that sets a specific transmission time interval (TTI) length as a TTI length to be used in a transmission of an uplink packet;
    a selector that (i) selects a specific table from among a plurality of tables each of which includes a plurality of data length candidates, wherein the plurality of groups differ in correspondence to different TTI lengths, and said selector selects a table corresponding to the specific TTI length as the specific table, and (ii) selects a data length of the uplink packet from among the data length candidates included in the specific table according to the specific TTI length; and
    a transmitter that transmits data length information which shows the data length selected by said selector.

6. The wireless communication terminal apparatus according to claim 5, wherein:
    a first table in the plurality of tables corresponds to a first TTI length; and
    a second table in the plurality of tables corresponds to a second TTI length, the second TTI length being shorter than the first TTI length, and, a maximum data length candidate included in the second table being shorter than a maximum data length candidate included in the first table.

7. The wireless communication terminal apparatus according to claim 5, wherein each of the plurality of tables has the same number of data length candidates.

8. The wireless communication terminal apparatus according to claim 5, wherein at least one table in the plurality of tables includes at least one same data length candidate as a data length candidate included in another table in the plurality of tables.

9. A wireless communication terminal apparatus, comprising:
    a setting section that sets a specific transmission time interval (TTI) length as a TTI length to be used in a transmission of an uplink packet;
    a storing section that stores a plurality of tables each of which includes part of a plurality of data length candidates applicable to the uplink packet, wherein maximum data length candidates included in the each of the tables are different from each other, and the tables differ in correspondence to different TTI lengths;
    a selector that (i) selects a specific table from among the plurality of tables, the specific table being a table corresponding to the specific TTI length, and (ii) selects a data length of the uplink packet by referencing the specific table according to the specific TTI length; and a transmitter that transmits data length information which shows the data length selected by said selector.

10. The wireless communication terminal apparatus according to claim 9, wherein:
a first table in the plurality of tables corresponds to a first TTI length; and
a second table corresponds to a second TTI length, the second TTI length being shorter than the first TTI length, and, a maximum data length candidate included in the second table being shorter than a maximum data length candidate included in the first table.

11. The wireless communication terminal apparatus according to claim 9, wherein each of the plurality of tables has the same number of data length candidates.

12. The wireless communication terminal apparatus according to claim 9, wherein at least one table in the plurality of tables includes at least one same data length candidate as a data length candidate included in another table in the plurality of tables.

13. A wireless communication method comprising:
setting a specific transmission time interval (TTI) length as a TTI length to be used in a transmission of an uplink packet;
selecting a specific group from among a plurality of groups each of which includes data length candidates, wherein the plurality of groups differ in correspondence to different TTI lengths and the selected specific group corresponds to the specific TTI length;
selecting a data length of the uplink packet from among the data length candidates included in the specific group according to the specific TTI length; and
transmitting transmission rate information corresponding to the selected data length.

14. The wireless communication method according to claim 13, wherein:
a first group in the plurality of groups corresponds to a first TTI length; and
a second group in the plurality of groups corresponds to a second TTI length, the second TTI length being shorter than the first TTI length, and, a maximum data length candidate included in the second group being shorter than a maximum data length candidate included in the first group.

15. The wireless communication method according to claim 13, wherein each of the plurality of groups of data length candidates has the same number of data length candidates.

16. The wireless communication method according to claim 13, wherein at least one group in the plurality of groups includes at least one same data length candidate as a data length candidate included in another group in the plurality of groups.

17. A wireless communication method comprising:
setting a specific transmission time interval (TTI) length as a TTI length to be used in a transmission of an uplink packet;
selecting a specific table from among a plurality of tables each of which includes a plurality of data length candidates, wherein the plurality of groups differ in correspondence to different TTI lengths and the selected specific table corresponds to the specific TTI length;
selecting a data length of the uplink packet from among the data length candidates included in the specific table according to the specific TTI length; and
transmitting transmission rate information corresponding to the selected data length.

18. The wireless communication method according to claim 17, wherein:
a first table in the plurality of tables corresponds to a first TTI length; and
a second table in the plurality of tables corresponds to a second TTI length, the second TTI length being shorter than the first TTI length, and, a maximum data length candidate included in the second table being shorter than a maximum data length candidate included in the first table.

19. The wireless communication method according to claim 17, wherein each of the plurality of tables has the same number of data length candidates.

20. The wireless communication method according to claim 17, wherein at least one table in the plurality of tables includes at least one same data length candidate as a data length candidate included in another table in the plurality of tables.

* * * * *